US 9,754,117 B2

(12) United States Patent
Bender et al.

(10) Patent No.: US 9,754,117 B2
(45) Date of Patent: Sep. 5, 2017

(54) SECURITY MANAGEMENT SYSTEM

(71) Applicant: NORTHCROSS GROUP, Portland, OR (US)

(72) Inventors: Christopher J. Bender, Falmouth, ME (US); David S. Wininger, Livermore, ME (US)

(73) Assignee: Northcross Group, Portland, ME (US)

( * ) Notice: Subject to any disclaimer, the term of this patent is extended or adjusted under 35 U.S.C. 154(b) by 0 days.

(21) Appl. No.: 14/628,712

(22) Filed: Feb. 23, 2015

(65) Prior Publication Data

US 2015/0242619 A1 Aug. 27, 2015

Related U.S. Application Data

(60) Provisional application No. 61/943,571, filed on Feb. 24, 2014.

(51) Int. Cl.
*G06F 21/60* (2013.01)
*H04L 29/06* (2006.01)
*G06F 21/57* (2013.01)

(52) U.S. Cl.
CPC .......... *G06F 21/604* (2013.01); *G06F 21/577* (2013.01); *H04L 63/10* (2013.01); *H04L 63/20* (2013.01); *G06F 2221/034* (2013.01)

(58) Field of Classification Search
CPC ........ G06F 21/604; H04L 63/10; H04L 63/20
See application file for complete search history.

(56) References Cited

U.S. PATENT DOCUMENTS

| 5,974,549 | A | 10/1999 | Golan |
| 6,963,740 | B1 * | 11/2005 | Guthery ............. H04L 63/0428 379/189 |
| 7,299,504 | B1 | 11/2007 | Tiller et al. |
| 7,669,051 | B2 | 2/2010 | Redlich et al. |
| 7,779,452 | B2 | 8/2010 | Goldberg |
| 8,140,415 | B2 | 3/2012 | Lawrence et al. |
| 8,171,530 | B2 | 5/2012 | Goldberg |
| 8,341,693 | B2 | 12/2012 | Shahbazi |
| 8,375,199 | B2 | 2/2013 | Young |
| 8,510,843 | B2 | 8/2013 | Mahaffey et al. |
| 8,516,594 | B2 | 8/2013 | Bennett et al. |
| 8,522,045 | B2 | 8/2013 | Senda |
| 8,572,744 | B2 | 10/2013 | Day et al. |

(Continued)

FOREIGN PATENT DOCUMENTS

| WO | 88/02142 A1 | 3/1988 |
| WO | 03/021402 A2 | 3/2003 |
| WO | 2004/021114 A2 | 3/2004 |

*Primary Examiner* — Jason C Chiang
(74) *Attorney, Agent, or Firm* — Brown Rudnick LLP

(57) ABSTRACT

The invention relates to a system for providing an automated security management framework for an enterprise based on the enterprise's operations, infrastructure, and user-based processes, as well as industry-specific rules and regulations associated with the enterprise. The system is configured to generate recommendations or instructions based on correlation of enterprise's operations, infrastructure, and user-based processes with industry-specific rules and regulations. The recommendations or instructions are then provided to a user associated with the enterprise so as to facilitate actions to be taken to address a potential security threat.

26 Claims, 25 Drawing Sheets

(56) References Cited

U.S. PATENT DOCUMENTS

| | | | |
|---|---|---|---|
| 8,607,325 B2 | 12/2013 | Kennedy | |
| 8,782,784 B1 | 7/2014 | Bruskin | |
| 8,806,621 B2 | 8/2014 | Maguire | |
| 8,813,235 B2 | 8/2014 | Sidagni | |
| 8,850,530 B2 | 9/2014 | Shahbazi | |
| 2008/0049779 A1* | 2/2008 | Hopmann | H04L 12/2807 370/431 |
| 2008/0168135 A1* | 7/2008 | Redlich | G06Q 10/10 709/204 |
| 2009/0099882 A1* | 4/2009 | Karabulut | G06Q 10/06 713/152 |
| 2009/0198697 A1* | 8/2009 | Bilger | G06F 21/6218 |
| 2009/0319480 A1* | 12/2009 | Saito | G06F 21/6218 |
| 2010/0095235 A1 | 4/2010 | Bennett et al. | |
| 2011/0093471 A1* | 4/2011 | Brockway | G06F 17/30616 707/747 |
| 2011/0119742 A1 | 5/2011 | Maguire | |
| 2011/0197076 A1 | 8/2011 | Crites et al. | |
| 2012/0096549 A1 | 4/2012 | Amini et al. | |
| 2012/0167163 A1* | 6/2012 | Lim | G06F 21/577 726/1 |
| 2013/0055337 A1 | 2/2013 | Choi et al. | |
| 2013/0124567 A1* | 5/2013 | Balinsky | G06F 17/30011 707/783 |
| 2013/0239177 A1* | 9/2013 | Sigurdson | H04L 63/102 726/4 |
| 2013/0253979 A1 | 9/2013 | Williams et al. | |
| 2014/0047546 A1 | 2/2014 | Sidagni | |
| 2015/0073955 A1* | 3/2015 | Gilman | G06Q 30/04 705/34 |
| 2015/0195301 A1* | 7/2015 | Bhargav-Spantzel | G06F 3/0484 726/22 |

* cited by examiner

SECURITY MANAGEMENT SYSTEM

CROSS-REFERENCE TO RELATED APPLICATIONS

This application claims the benefit of, and priority to, U.S. Provisional Application Ser. No. 61/943,571, filed Feb. 24, 2014, the content of which is incorporated by reference herein in its entirety.

FIELD

The present disclosure relates generally to information security, and, more particularly, to a system for providing an automated security management framework for an enterprise based on the enterprise's operations, infrastructure, and user-based processes, as well as industry-specific rules and regulations associated with the enterprise.

BACKGROUND

Information security is the practice of defending information from unauthorized access, use, disclosure, disruption, modification, perusal, inspection, recording, or destruction. The breadth and depth of information security threats is increasing exponentially, particularly as individuals, organized crime, nation states, as well as hactivist groups continue to realize monetary and promotional gain from attacks on cyber infrastructure. Accordingly, enterprises such as business entities, companies, organizations, government agencies, and the like, must take action to protect their operations, systems, data, and the data of their partners and customers from such threats. To be successful, these actions must provide the broadest possible reach across the enterprise's environment and cross many different types of functions and facets of operations. This is necessary to mitigate gaps and address physical, technological, and procedural elements of the enterprise's security posture. An enterprise's security measures are only as effective as its weakest link Many enterprises will utilize some form of a security management system to protect their confidential and valuable information. Current security management systems may provide specific security components with specific functions, such as, for example, endpoint protection, network access, file systems protection, or pattern analysis identification which may result in filtering network traffic into and out of the enterprise for malicious code such as viruses and worms, limiting access to inappropriate external content on the internet from inside the enterprise, and preventing attacks and other intrusions on the enterprise network.

Despite the current offering of sophisticated security systems, many enterprises struggle to understand their current security posture, and further lack the ability to measure the effectiveness of their current security policies in addressing security threats. Furthermore, existing security management systems are focused on a specific vulnerability scope. While they are very effective in monitoring certain elements and presenting data and information related to that scope, they lack the breadth of data collection and processing to cover an organization's overall security exposure. Thus the organization is left assuming the risks associated with an area not monitored, which results in a weak link that is most at risk for exploitation.

Furthermore, current security systems generally lack capability to deal with people, processes, technology infrastructure, and all facets of interaction with partners and customers. Securing the data and information resources of an organization is not solely an exercise of firewalling network traffic or keeping current with virus protection. As evidenced by highly publicized retail and banking breaches, security is a function of people-based processes and interfaces with third parties and their systems. In some cases, an organization may be unaware of an attack or breach until after the effects are noticed by employees and/or customers.

Even with sophisticated security systems for threat monitoring and detection, organizations struggle to understand the data provided. As such, organizations are left with the responsibility to pull information from various limited-scope security systems, as well as people-based processes to build a security program, figuring out what is needed to share with the organization and determine what actions to take. The challenges of running an information security program can be overwhelming. There are many areas to address—from encryption, to application security, to disaster recovery. Furthermore, there is the complication of compliance with regulatory requirements such as HIPAA, PCI DSS and Sarbanes-Oxley, just to name a few. Accordingly, organizations struggle with gaps and inconsistencies in capabilities across the spectrum of their security posture and are left with an inefficient security posture which is vulnerable to security threats.

SUMMARY

The present invention relates to a system for providing a comprehensive automated security solution for organizing the entire breadth of an enterprise's security posture. A security posture is generally understood to be an enterprise's overall security plan—the approach an organization takes with regard to security, from planning to implementation. A security posture may include technical and non-technical policies, procedures and controls, designed to protect an enterprise from both internal and external threats. More than policies and procedures, security must become intuitive at every level of the enterprise and needs to be a primary part of the culture, similar to quality, safety, and innovation.

The system of the present invention is unique in that it is configured to provide an organization, or other type of enterprise, with an automated security management framework for organizing and managing security efforts across different component areas (i.e. security architecture, business continuity and disaster recovery, training, compliance, etc.), a solution which current security systems lack. More specifically, the system is configured to tailor or customize security management based on industry, people, infrastructure, and the like, so as to help an organization define, develop, and implement an optimal security program to meet the demands of that organization based on current needs in the industry, people, etc.

The security management framework is configured to interface with an organization's existing system so as to extend and enhance capabilities already in place. The framework includes a security model for providing access management by users or groups, generally in a role-based manner. For example, different user groups may be established that provide different corresponding levels of access to the information security roles of the organization. Specific management functions may be reserved for certain groups (e.g., administrators, executives, IT security personnel). The framework provides an interface in which a user may access, receive, manage, or oversee information security across the entire organization. The organization may have key third parties, that while outside the organization's user access management system, play a key role in the security posture of the organization and have need to interact with the organization on security related matters.

The system is configured to provide real-time monitoring of an organization's security data, as well as actions and tasks that contribute to the overall security posture, while accounting for industry dynamics and current threats in the environment. More specifically, the system is configured to provide real-time integration of an organization's internal data and information with industry requirements and frameworks, as well as security and industry subject matter expertise, in light of current security threat vectors. The system utilizes industry-specific rules, regulations, and known security threats to evaluate the organization's overall security posture on a real-time and ongoing basis. Upon analyzing the integrated data (both the organization data and the industry-specific data), the system is configured to provide tasking and tailored workflows directly to the responsible user within the organization to facilitate actions to improve the overall security posture. More specifically, the system is configured to provide recommendations or instructions to one or more users, via the interface, to facilitate actions to be taken to address a potential security threat. The recommendation(s) may be tailored to a specific user based, at least in part, on the user's role in the organization or specific user characteristics. The system is further configured to provide a closed-, or feedback-, loop process, in which feedback of related efforts and progress with respect to workflow assignments, including compliance and response functions, is collected and further analyzed with integrated data to further refine output over time.

The system is configured to deliver recommendations in the form of task and workflow assignments for the appropriate user. Accordingly, all members of an organization may have visibility to workflow assignments via the interface, thereby keeping users abreast of current security-related items in real-time. The interface further allows certain authorized users (e.g., managers, executives, IT security) with tracking, oversight, and governance across the security framework, thereby improving visibility of an organization's current security status. Accordingly, the system is configured to organize the tracking of efforts or response being taken, the associated elements engaged in such efforts or response, and all while accounting for regulatory and industry requirements.

The system of the present invention addresses the drawbacks of current security systems. The system of the present invention is configured to provide organizations a means in which to manage effort and information distribution across the entire spectrum of their security posture. In particular, the system connects security components that are otherwise isolated, and fills in gaps where capabilities do not exist or lack sufficient capability to raise the competency of any weakest-link in the security spectrum so as to reduce the threat and/or impact of security related issues. The system provides expansive security coverage with controls and measures that span an organization's operations, infrastructure, and people-based processes. The system supports the organization in both reactive and proactive manners, thereby allowing the organization to both address incidents as they occur, as well as take steps to minimize the risk of security incidents based on industry and specific organization profile.

The system further provides support or instructions of steps to take to address potential security threats, thereby relieving the organization of some of the burden that current security systems otherwise place on members of an organization or seek from outside consultation. The system has a collection of analyzed and processed information from past security efforts and events to the organization's analytics functions and processing of data for support of tasking and workflow creation, to further support security insight and action output. Additionally, in certain regulated industries, regulatory requirements and industry agreement standards must be followed. Critical infrastructure industries operate under a myriad of regulations, guidance and industry standards. These are in place due to the very nature of the role these industries play in our nation's safety, security, and economy. Current security systems lack a process for taking such industry-specific requirements and standards into account. The present invention takes a programmatic approach and considers the context of the organization and the types of activities it engages in, with the need to take steps based on their operational requirements and needs. More specifically, the system of the present invention takes industry-specific rules and regulations related to security into account during data integration and production of workflow assignments or instructions. Accordingly, the system is configured to ensure an organization's compliance with industry standards.

In one aspect, the present invention relates to a system for providing a tailored security management framework for a business entity based on the business entity's operations, infrastructure, and user-based processes, as well as industry-specific rules and regulations associated with the business entity. The system includes a network-based computing system configured to communicate and exchange data with one or more network access computing devices via a communications network. The network-based computing system includes a first memory for receiving and storing a first set of data associated with the business entity. The first set of data includes information related to at least one of the business entity's operations, the business entity's infrastructure, the business entity's procedures and policies, and one or more users authorized to have access to the system and exchange data associated with the business entity. The network-based computing system further includes a second memory for receiving and storing a second set of data associated with an industry to which the business entity is related. The second set of data includes industry-specific rules, regulations, and known security threats.

The network-based computing system further includes a processor that correlates the first and second sets of data with one another and generates a plurality of security schemes for use in the security management framework to assess and address potential security threats. An interface receives a request for access to data associated with the business entity. Upon receiving the request, the processor compares request data with the plurality of security schemes and identifies a corresponding security scheme based on the comparison. The processor outputs informational data associated with the identified security scheme to a user associated with the one or more network access computing devices to facilitate actions to be taken in response to the received request for access to the business entity data.

The first set of data may further include, but is not limited to, human resources, policies and procedures, physical infrastructure, virtual infrastructure, operating agreements, operational logs, risk factors, risk indicators, one or more users or parties associated with the business entity and corresponding level of security clearance with respect to business entity data, and a combination thereof. The second set of data may further include, but is not limited to, regulatory requirements, industry rules, industry threats, and a combination thereof.

The request data may include, for example, an identity of a user or party requesting access, characteristics of a user or party requesting access, type of access requested, identity and characteristics of business entity data requested to be accessed, and a combination thereof. The characteristics of the user or party requesting access may include user or party credentials, user or party role with respect to the business entity, user or party assignment to one of an internal trusted group and an external trusted group, and a combination thereof.

The informational data associated with the identified security scheme may include, but is not limited to, a level of threat associated with the request, identity of a user or party requesting access, assigned role and level of clearance of a user or party requesting access with respect to the business entity, sensitivity of business entity data requested to be accessed, protocol for addressing the requested access, actions required in order to fulfill request, and a combination thereof.

In some embodiments, the processor is configured to factor the first and second sets of data based on an algorithm accounting for applicability, priority, and risk assessment variables and set priority and baseline values for each of the plurality of security schemes based on the factoring step. The processor may further be configured to continually monitor for input data from one or more users via the interface and update generated security schemes by correlating the input data with the first and second sets of data.

The network-based computing system may include a server configured to manage business entity data and provide access to the business entity data to a user associated with the one or more devices over the network via a wired transmission or a wireless transmission protocol. The wireless transmission protocol may include, for example, Bluetooth communication, infrared communication, near field communication (NFC), radio-frequency identification (RFID) communication, cellular network communication, the most recently published versions of IEEE 802.11 transmission protocol standards as of February 2015, and a combination thereof.

The one or more network access computing devices may include, for example, a personal computer (PC), a desktop computer, a notebook computer, a tablet computer, a mobile computing device, a smartphone, a cellular telephone, a messaging device, a work station, a network appliance, a web appliance, a distributed computing system, a multiprocessor system, a processor-based system, a consumer electronic device, and a combination thereof.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

Figure 1:
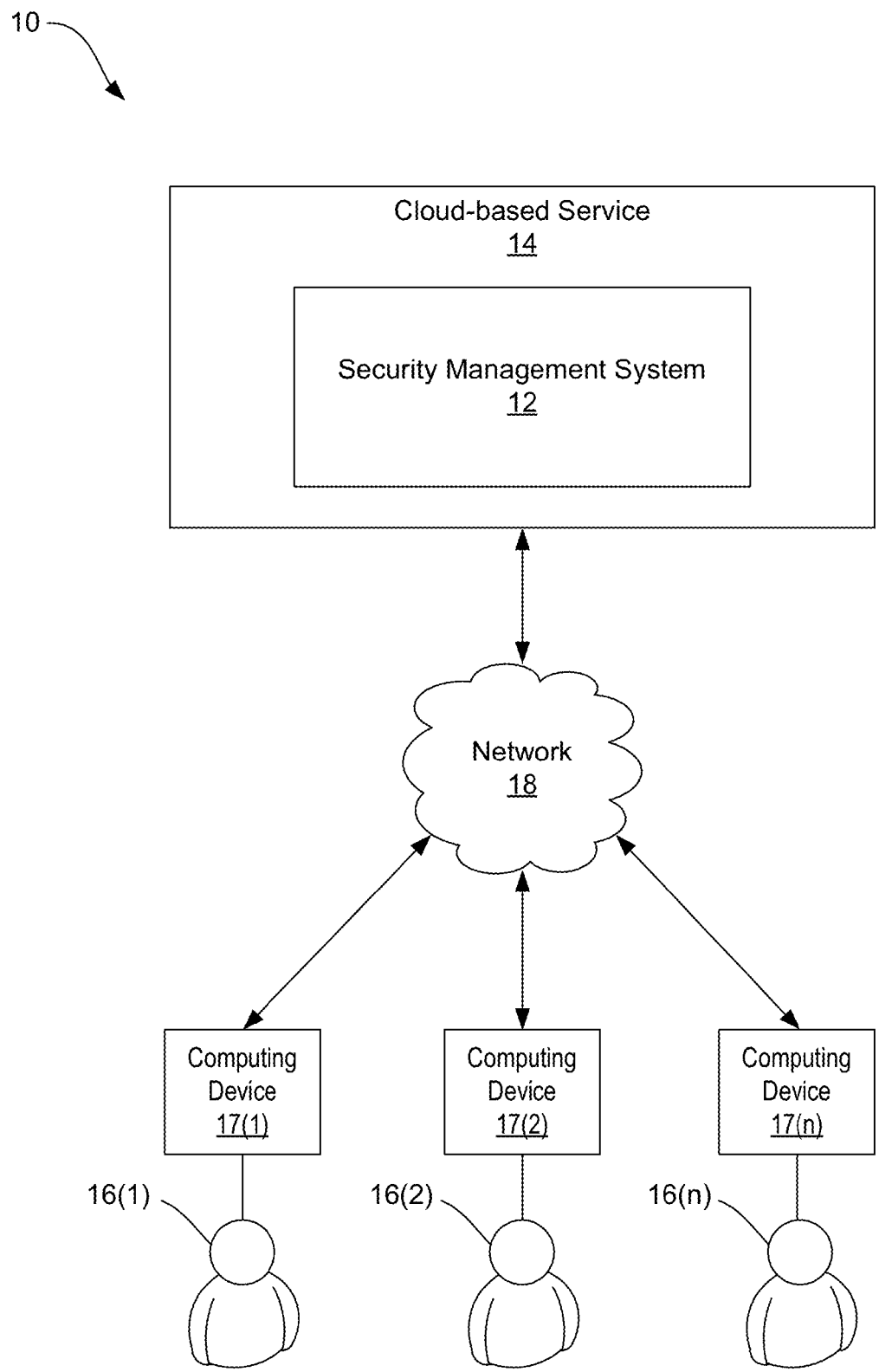
FIG. 1 is a block diagram illustrating one embodiment of an exemplary system for providing a tailored security management framework for an organization consistent with the present disclosure.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present disclosure generally relates to a system for providing improved information security management for an enterprise. For the purposes of discussion, and ease of description, the following description focuses on systems for providing a comprehensive automated security solution for organizing the entire breadth of an organization's or business entity's security posture. However, it should be noted that systems described herein may be used for all types of enterprises, including, but not limited to, a business, company, corporation, or any other entity having confidential, or otherwise proprietary or critical information requiring security and protection. The terms "organization" and "business entity" may be used interchangeably throughout the following description.

As generally understood, a security posture is generally understood to be an enterprise's overall security program—the approach an organization takes with regard to security, from planning to implementation spanning the many different technical, operational, and procedural aspects of the organization's environment. A security posture may include technical and non-technical policies, procedures and controls, designed to protect an enterprise from both internal and external threats. More than policies and procedures, security must become intuitive at every level of the enterprise and needs to be a primary part of the culture, similar to quality, safety, and innovation.

The system of the present invention is unique in that it is configured to provide an organization with an automated security management framework for organizing and managing security efforts across different component areas (i.e. security architecture, business continuity and disaster recovery, training, compliance, etc.). More specifically, the system is configured to tailor or customize security management based on industry, data, people, processes, infrastructure, and the like, so as to help an organization define, develop, and implement an optimal security program to meet the demands of that organization based on current needs in the industry, people, etc.

The security management framework is configured to interface with an organization's existing system so as to extend and enhance capabilities already in place. The framework includes a security model for providing access management by users or groups, generally in a role-based manner. For example, different user groups may be established that provide different corresponding levels of access to information security of the organization. Specific management functions may be reserved for certain groups (e.g., administrators, executives, IT security personnel). The framework provides an interface in which a user may access, receive, manage, or oversee information security across the entire organization.

The system is configured to provide real-time monitoring of an organization's security posture while accounting for industry dynamics and current threats in the environment. More specifically, the system is configured to correlate information about threats and requirements for a given industry with information about an organization and the people within it. The correlated data is used to produce communications, tasks, and facilitate workflows to prevent or address potential security issues based on the correlated data. More specifically, the system is configured to provide recommendations or instructions to one or more users, via the interface, to facilitate actions to be taken to address a potential security threat. The recommendation(s) may be tailored to a specific user based, at least in part, on the user's role in the organization or specific user characteristics. The system is further configured to provide a closed-, or feedback-, loop process, in which feedback of related efforts and progress with respect to workflow assignments, including compliance and response functions, is collected and further analyzed with integrated data to further refine output over time.

The system of the present invention addresses the drawbacks of current security systems. The system of the present invention is configured to provide organizations a means in which to manage effort and information distribution across the entire spectrum of their security posture. In particular, the system connects security components that are otherwise isolated, and fills in gaps where capabilities do not exist or have insufficient capability to raise the competency of any weakest-link in the security spectrum to reduce the threat and/or impact of security related issues. The system provides expansive security coverage with controls and measures that span an organization's operations, infrastructure, and people-based processes. The system supports the organization in both reactive and proactive manners, thereby allowing the organization to both address incidents as they occur, as well as take steps to minimize the risk of security incidents based on industry and specific organization profile.

The system further provides support or instructions of steps to take to address potential security threats, thereby relieving the organization of some of the burden that current security systems otherwise place on members of an organization. Additionally, in certain regulated industries, regulatory requirements and industry agreement standards must be followed. Critical infrastructure industries operate under a myriad of regulations, guidance and industry standards. These are in place due to the very nature of the role these industries play in our nation's safety, security, and economy. Current security systems lack a process for taking such industry-specific requirements and standards into account. The present invention takes a programmatic approach and considers the context of the organization and the types of activities it engages in, with the need to take steps based on their operational requirements and needs. More specifically, the system of the present invention takes industry-specific rules and regulations related to security into account during data integration and production of workflow assignments or instructions. Accordingly, the system is configured to ensure an organization's compliance with industry standards.

Turning to FIG. 1, one embodiment of an exemplary system 10 is generally illustrated. As shown, the system 10 includes security management system 12 that may be embodied on an internet-based computing system/service. For example, as shown, the security management system 12 may be embodied on a cloud-based service 14, for example. It should be noted, however, that in some embodiments, the security management system 12 may be implemented locally. For example, the system 12 may be embodied on a local server. In some embodiments, the local server may be associated with a back end system of a business entity, company, organization, corporation, or the like. As generally understood, a back end system may be used to run a business entity, effectively supporting the business entity's back office, collecting input from users or other systems for processing. As such, the local server may include servers, superservers, clustered systems, midrange systems, and mainframes that provide data services to users. Accordingly, the system 10 may include server farm or data center, including a plurality of servers. In the following description, the security management system 12 is embodied on a cloud-based service 14.

The security management system 12 is configured to communicate and share data with one or more users 16(1)-16(n) over a network 18. In the present context, the users 16(1)-16(n) may include one or more members of a business entity, for example. The users 16 may be general employees, executives, administrators, IT staff, and the like. Additionally, or alternatively, some users 16 may be a third party (e.g., customer, vendor, contractor, etc.) who is otherwise not an employee of the business entity, but has a relationship with the business entity and thus may require access to business entity data and/or exchange data with one or more members of the business entity.

As described in greater detail herein, the security management system 12 is configured to provide an interface or portal with which the one or more users 16(1)-16(n) may interact for the purposes of accessing business entity data, as well view current security-related information associated with the business entity's security posture, thereby keeping users abreast of current security-related items in real-time. The interface further allows certain authorized users (e.g., managers, executives, IT security) with tracking, oversight, and governance across the security framework, thereby improving visibility of a business entity's current security status. For example, the security management system 12 is configured to communicate and share data with a device associated with one or more users 16 (hereinafter referred to as computing device 17). The computing devices 17(1)-17(n) may be embodied as any type of device for communicating with the security management system 12 and cloud-based service 14, and/or other user devices over the network 18. Accordingly, the computing device 17 may be understood to be a network access computing device 17. For example, at least one of the computing devices 17 may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a distributed computing system, a multiprocessor system, a processor-based system, and/or any other computing device configured to store and access data, and/or to execute software and related applications consistent with the present disclosure.

The network 18 may be any network that carries data. Non-limiting examples of suitable networks that may be used as network 18 include Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, Near Field Communication (NFC), the most recently published versions of IEEE 802.11 transmission protocol standards as of February 2015, other networks capable of carrying data, and combinations thereof. In some embodiments, network 18 is chosen from the internet, at least one wireless network, at least one cellular telephone network, and combinations thereof. As such, the network 18 may include any number of additional devices, such as additional computers, routers, and switches, to facilitate communications. In some embodiments, the network 18 may be or include a single network, and in other embodiments the network 16 may be or include a collection of networks.

As will be described in greater detail herein, the security management system 12 is configured to combines data about the business entity, including the business entity's data, processes, infrastructure, and people. The security management system 12 includes various interfaces configured to capture data from automated systems as well as manual processes. The business entity data is combined with industry specific rules and regulations within the construct of a comprehensive security program, upon which the security management system 12 processes these two sets of data (business entity data and industry-specific data) to provide outputs of information presented to end users regarding their current security profile with supporting details of actions to be taken for improvements and/or addressing a current security threat.

Users 16 within a business entity (e.g., employees, executives, administrators, IT staff), as well as users having a relationship with the business entity (e.g., third-party users), are able to interact with the security management system 12 via network access computing devices 17 over the network 18, while system interface through persistent and scheduled data exchanges. As the business entity and the external environment evolves, the security management system 12 is configured to assimilate data and information for user consumption and action. The security management system 12 is configured to track efforts and results organized by security domains with interfaces between domains and people.

It should be noted that the security management system 12, as well as other systems or modules described in greater detail herein, may include a general purpose computing device in the form of a computer. Components of the computer may include, but are not limited to, a processing unit, a system memory, and a system bus that couples various system components including the system memory to the processing unit. The system bus may be any of several types of bus structures including a memory bus or memory controller, a peripheral bus, and a local bus using any of a variety of bus architectures. By way of example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The computer may include a variety of computer-readable media. Computer-readable media can be any available media that can be accessed by the computer and includes both volatile and nonvolatile media and removable and non removable media.

By way of example, computer-readable media may comprise computer storage media and communication media. Computer storage media includes volatile and nonvolatile, removable and non removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer. Communication media typically embodies a non-transitory computer-readable medium having instructions, data structures, program modules, or other data.

The system memory may include computer storage media in the form of volatile and/or nonvolatile memory such as read-only memory (ROM) and random access memory (RAM). A basic input/output system (BIOS), containing the basic routines that help to transfer information between elements within the computer, such as during start-up, is typically stored in ROM. RAM typically contains data and/or program modules that are immediately accessible to and/or presently being operated on by the processing unit. The computer may further include an operating system, application programs, other program modules, and program data.

Figure 2:
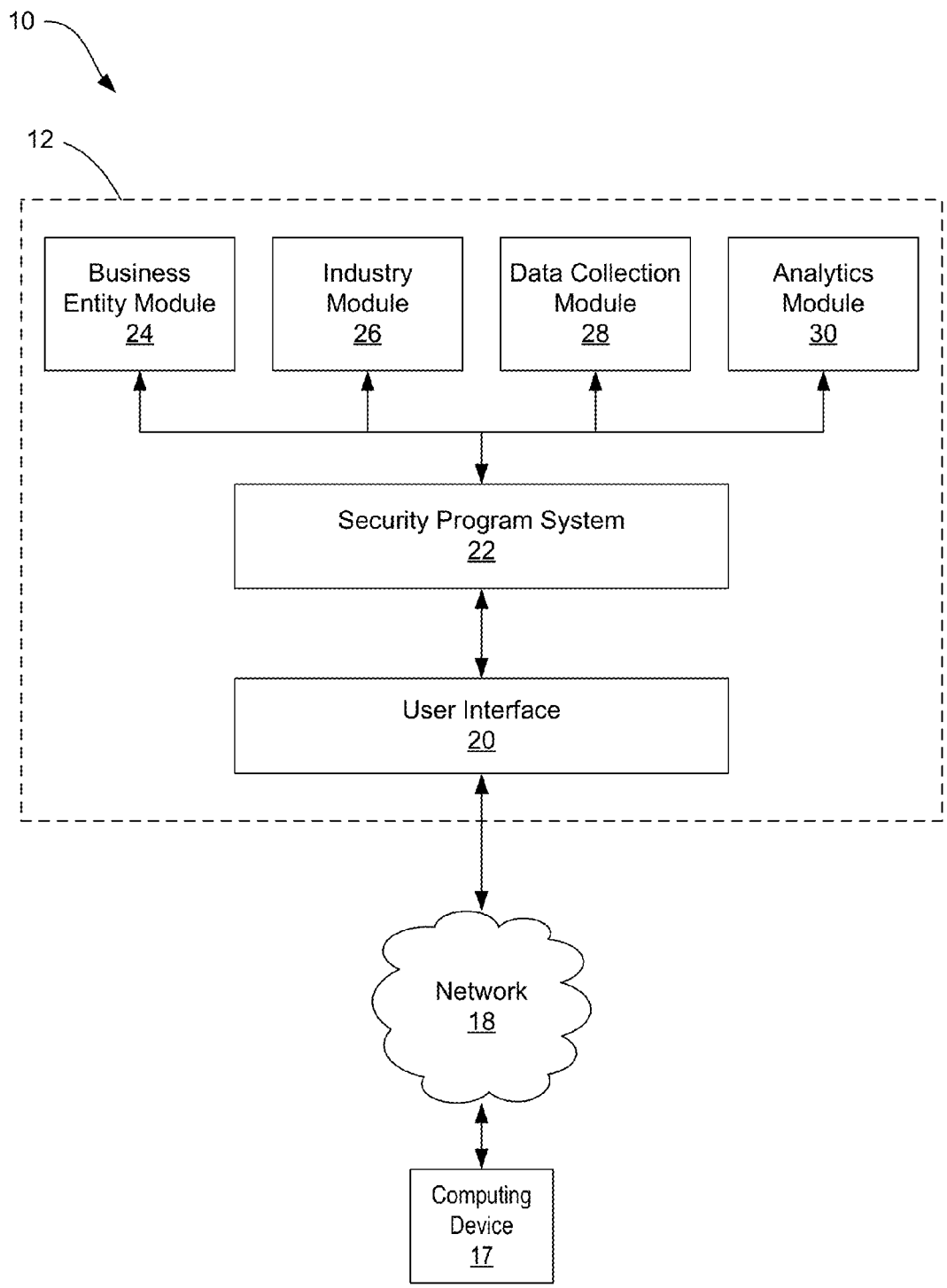
FIG. 2 is a block diagram illustrating the security management system of FIG. 1 in greater detail.

FIG. 2 is a block diagram illustrating the security management system 12 of FIG. 1 in greater detail. The security management system 12 includes a user interface 20, a security program system 22, and external data source processing modules, including a business entity module 24, an industry module 26, a data collection module 28, and an analytics module 30. As will be described in greater detail herein, the security program system 22 is configured to be accessed by users 16 (via computing device 17) over the network 18, wherein the users are provided with an interface 20 in which they can interact with, so as to navigate various tools and options related to the security framework of their business entity. The security program system 22 is configured to communicate and exchange data with a plurality of data sources (e.g., external data source modules 24-30), including a data sources related to the business entity and it infrastructure (business entity module 24), data related to security for the industry that the business entity operates within (industry module 26), a direct system user data collection (data collection module 28), and analytics configured to assess data and patterns (analytics module 30).

Figure 3A:
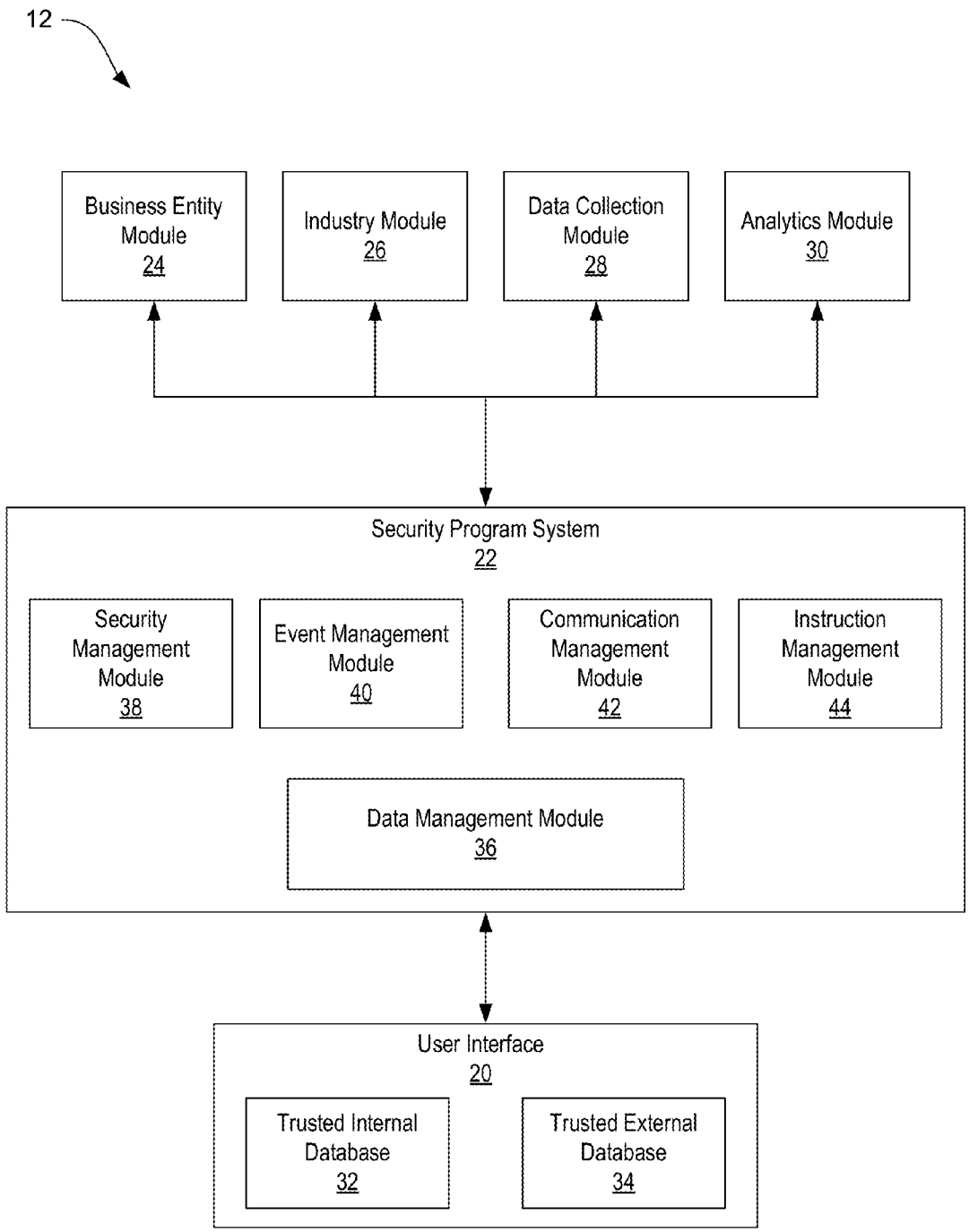
FIG. 3A is a block diagram illustrating the security program system of FIG. 2 in greater detail.
Figure 3B:
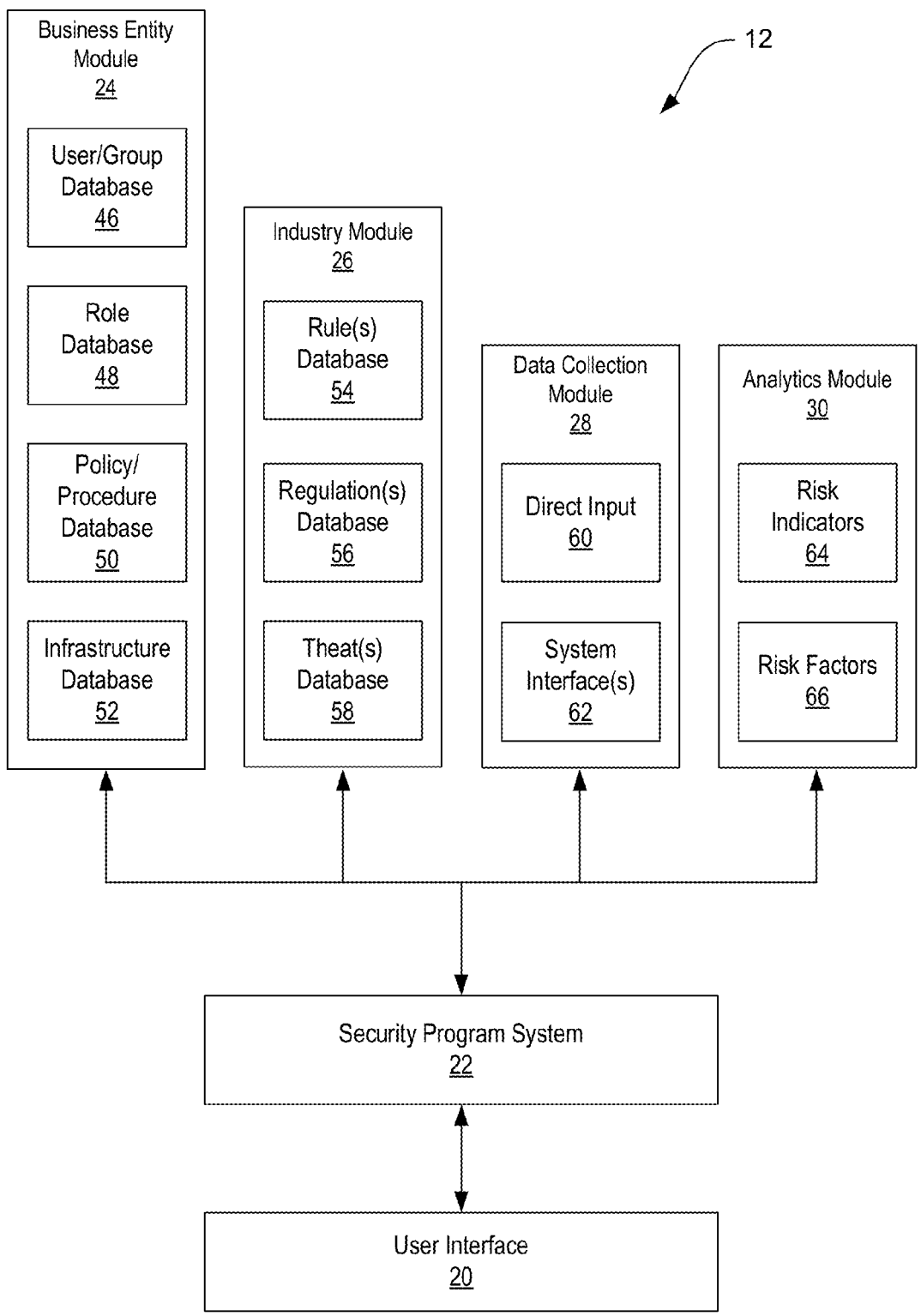
FIG. 3B is a block diagram illustrating the business entity, industry, data collection, and analytics modules of FIG. 2 in greater detail.

FIGS. 3A and 3B are block diagrams illustrating the interface 20, the security program system 22, and the external data source processing modules (modules 24-30) in greater detail. The security management system 12 provides multiple user interface options though any network access web-enabled device and further supports the specific interface preferences of the user. The security management system 12 includes authentication and access architecture based on relationship groups that align users with one or multiple groups related to either internal or external parties. Accordingly, the user interface 20 generally includes a trusted internal database 32 and a trusted external database 34, each database 32, 24 generally includes profiles of users who are trusted, or otherwise permitted to have access to business entity data via the system 12.

For example, as part of the authentication and access architecture, the system 12 is configured to screen a user attempting to access business entity data by verifying the credentials of the user and determining whether they are part of a trusted internal group or trusted external group. The verification process may include a typical login scenario in which a user must log in to the system 12 by providing credentials (e.g., username, password, etc.), wherein the system 12 will compare the credentials with profiles of each database 32, 34 to determine whether the user is allowed access. It should be noted that in some embodiments, the verification process may be somewhat passive on the user's end in the sense that the system 12 may not prompt a user to provide credentials in order to gain access, but rather the system 12 is configured to sense attempted or requested access (e.g., user attempts to open certain file) and can further collect information or data associated with the user and their request. For example, the system 12 may be configured to collect an identity of a user requesting access, characteristics of the user requesting access, the type of access requested, identity and characteristics of business entity data requested to be accessed, and a combination thereof. The characteristics of the user requesting access may include, for example, user credentials, user role with respect to the business entity, user assignment to one of an internal trusted group and an external trusted group, and a combination thereof. The collected data may then be compared against profiles of trusted users in both the internal and external databases 32, 34 so as to determine whether the user may have access to the specific data they are attempting to access.

An internal user may be understood to include members of the business entity (e.g., employees, executives, administrators, IT staff, etc.). An external user may be understood to include persons or parties who may not be members of the business entity, but have some other relationship or tie to the business entity. For example, vendors and key third parties often handle critical data or have access to internal systems. As such, these external users are an important part of a security program that is overlooked in many organizations. The security management system 12 is configured to handle external users/parties in a controlled and secure way, allowing them to interact and share information and actions with internal users and groups, without exposing or compromising data integrity.

Upon gaining access to the system 12 on the cloud-based service 14, the interface 20 may generally provide a user with a platform or interface which may be tailored to a specific user for presenting security-related information, as well as security posture management tools and options. As generally understood, the platform or interface is in the form of an interface (e.g., but not limited to graphical user interface (GUI)) provided on the user's computing device through which a user may interact with the system 12. The user interface 20 provides consistent access to data and information that a specific user is permitted to have access to. For example, user access to data may be limited based on user credentials (e.g., role-based access). Accordingly, some users may have a lower role in the business entity and may be considered a general user and provided access to data having a low clearance level associated therewith (little or no criticality). Some users, such as executives or administrators, as well as IT staff, may have a higher role in the business entity and thus may have access to high clearance level type data (critical information), as well a management tools. Accordingly, presentation of information on the platform or interface is focused on the required actions and information generated related to those actions under the enterprise security program to support the user in completing actions without putting the burden on the user to find items that need attention. As will be described in greater detail herein, the platform or interface may present the user with security-related information associated with the security posture of the business entity and may further allow the user to navigate a dashboard (shown in FIG. 10, for example) to view specific information or utilize tools.

The security program system 22 is configured to provide data aggregation and processing of disparate data sources within the context of a comprehensive security program components. The security program system 22 is configured to manage the identification and distribution of communication of data and information for the business entity across various security components. The security program system 22 is further configured to create work instructions or assignments organized by security component areas as applicable for a business entity, and tracks and validates efforts with direct interaction with users. Accordingly, the security program system 22 may generally act as the central processing unit of the system 12. For example, within the security program system 22, quantitative and qualitative data from a range of external sources is collected and processed. This data is integrated with data collected through the user interfaces. The processed data is classified for use across security program functions and used to develop information and work instructions that will be presented to users based on their roles. Events are managed and correlated with security program components, providing additional inputs to the communication and work instruction functions.

As shown in FIG. 3A, the security program system 22 includes a data management module 36, a security management module 38, an event management module 40, a communication management module 42, and an instruction management module 44. The data management module 36 is configured to processes quantitative and qualitative data into a structured format. The data management module 36 may utilize data gateway interfaces to third party systems, as well as user interface direct data inputs. The security management module 38 is configured to organize system functions and data into security functions support a plurality of security program components for providing users, via the user interface, with visibility to security-related information as well as the ability to track, oversee, and govern the entire security framework of the business entity, thereby improving visibility of an organization's current security status. The security program components may include, but are not limited to, Access Management, Audits, Business Continuity, Change Management, Communications Management, Compliance, Configurations and Hardening, Critical Resource Identification, Event Management, Help Desk Support, Incident Management, Inventory Management, Third Party/Vendor Management, Task Management, Risk Management, Project Management, and Training Management. Relationships, dependencies, and critical path tracking of data between security components is managed via relationship groups that are updated based on a user, and validity may be tracked by function utilization by users. This enhances the accuracy of relationship groups overtime, similar to the development of synapse connections in the human brain over time.

The event management module 40 is configured to identify and manage the response and recovery of security events and further broker the distribution of data and work instructions based on event specific circumstances and program relationship groups. The function of the event management module 40 provides the ability to implement special access provisions to support event related efforts and circumstances. The communication management module 42 is configured to process data from the data management module 36 and event management module 40 to develop user-centric communications for users. The different relationship groups may be used to determine communication distributions paths and presentation. The instruction management module 44 is configured to process inputs from the security management module 38, event management module 40, and communication management module 42 to create user- and role-specific work instructions that are presented through the user interface 20. As response data is collected by users fulfilling their security program actions, the data may be provided to the data management module 36 to further continue processing of data, thereby creating a continuous processing loop.

FIG. 3B is a block diagram illustrating the business entity, industry, data collection, and analytics modules (24-30) in greater detail. Data collection in each of the modules 24-30 may be supported through a combination of system and direct user interfaces. The business entity module 24 is configured to collect data associated with the business entity. The data collected by the business entity module 24 may include information related, but not limited to, the business entity's operations, the business entity's infrastructure, the business entity's procedures and policies, and one or more users authorized to have access to the system and exchange data associated with the business entity. Accordingly, the data collected includes user and group information (stored in a user/group database 46), user and group system role data (stored in a role database 48), organizational policy and procedure data (stored in a policy/procedure database 50), and data about the business entity's infrastructure (stored in the infrastructure database 52). The data collected with the business entity module 24 and subsequently stored in corresponding databases 46-52 may include, but is not limited to, human resources, policies and procedures, physical infrastructure, virtual infrastructure, operating agreements, operational logs, risk factors, risk indicators, one or more users or parties associated with the business entity and corresponding level of security clearance with respect to business entity data, and a combination thereof.

Human resource data generally describes the people, reporting structures, and roles played in the business entity. Policies and procedures data generally describes steps and functions performed in the business entity. The physical infrastructure data generally relates to detailing hardware and network resources in or connecting to the business entity. The virtual infrastructure data relates to detailing software and logical processing functions in the business entity. Operating agreements data details interfaces and agreements steps and functions with third parties or other external users. The operational logs data details access, utilization, and processing data from business entity systems. Direct user input is data collected through the user interface. Risk factors and risk indicators data provides description and scale collected through the user interface or via a direct system interface. This business entity data may be processed in the program processing algorithms in the security program system 22, as will be described in greater detail herein.

The industry module 26 is configured to collect data associated with an industry to which the business entity is related. The data collected by the industry module 26 may include information related, but not limited, to industry-specific rules, regulations, and known security threats. Accordingly, the industry module 26 may further store such data in corresponding rules database 54, regulation database 56, and threat database 58. As generally understood, some industries are highly regulated, such as the medical industry (e.g., hospitals, patient care, lab processing and disclosure) or financial industry (e.g., banking, mortgage industry, etc.), as these industries deal with highly sensitive information. As such, business entities within such industries are required to strictly follow regulatory requirements and industry agreement standards.

The type of data collected with the industry module 26, and subsequently stored in corresponding databases 54-58, may include, but is not limited to, regulatory requirements, industry rules, industry threats, and a combination thereof. Regulatory requirements are those requirements associated with the applicable industry, such as the Health Insurance Portability and Accountability Act (HIPAA) Omnibus Rules for protecting the confidentiality and security of healthcare information, or Office of the Comptroller of the Currency (OCC) 2013-29 for providing risk management assessment and guidance for banks with third-party relationships, or the Federal Financial Institutions Examination Council (FFIEC) Security Standards requirements. Industry rules are those rules associated with the applicable industry, such as the Payment Card Industry (PCI) Security Standards, the National Provider Identifier (NPI) standards, and the National Automated Clearing House (NACHA) standards. The PCI Security Standards are for protecting cardholder data, providing rules or standards for security management, policies, procedures, network architecture, software design and other critical protective measures. The NPI standards is a HIPAA Administrative Simplification Standard providing rules for how security management of NPI (unique identification for covered health care providers) must be implemented. NACHA standards generally provide operating rules defining the roles and responsibilities of financial institutions and establishing clear guidelines for handling Automated Clearing House (ACH) payments.

The industry threats are those threats associated with the applicable industry, such as those known security threats published by Computer Security Incident Response Center (CSIRC), the National Institute of Standards and Technology (NIST), and International Organization for Standardization (ISO). Furthermore, CSIRC, NIST, and ISO may be used to obtain risk factors or risk indicators associated with a specific industry.

The data collection module 28 is configured to collects data to support the function of the security program system 22 by brokering the actual data collection from direct user input 60 or system interfaces 62. The analytics module 30 is configured to process stored data over time to organize data related to risk indicators 64 and risk factors 66.

As previously described herein, the security program system 22 is configured to provide data aggregation and processing of disparate data sources within the context of a comprehensive security program components. The security program system 22 is configured to receive data from the business entity module 24, including at least one of data related to at least one of the business entity's operations, the business entity's infrastructure, the business entity's procedures and policies, and one or more users authorized to have access to the system and exchange data associated with the business entity. The security program system 22 is further configured to receive data from the industry module 26, including, for example, industry-specific rules, regulations, and known security threats. The security program system 22 is configured to process both sets of data (business entity data and industry data) so as to correlate the sets of data with one another. Based on the correlation, the security program system 22 is configured to generate and provide outputs of information presented to end users regarding their current security profile with supporting details of actions to be taken (e.g., work instructions) for improvements and/or resolving security issues.

The security program system 22 may include may include custom, proprietary, known and/or after-developed statistical analysis code (or instruction sets), hardware, and/or firmware that are generally well-defined and operable to receive two or more sets of data and identify, at least to a certain extent, a level of correlation and thereby associate the sets of data with one another based on the level of correlation. The security program system 22 may utilize a number of algorithms and data matrices to combine different sets of data (business entity data and industry data) and align it with comprehensive security program architecture. It should be noted that the following functions and algorithms described herein are non-limiting and it is contemplated that such functions/algorithms may evolve as the security program system 22 of the present disclosure further develops and becomes more refined. Such additional functions/algorithms may be described in additional related applications. In one embodiment, correlation may be accomplished by the domain of the security program (prog) being defined on an interval of the industry (i) a business entity (b) belongs to the specific business entity composition (comp). This function is built by program components relationship group (RG), which is driven by applicability (a), priority (p), and risk assessment, as illustrated in the following equations:

$$\int_b^i \text{prog} = (\text{prog}_{comp}) \times RG_{ap} \times RA$$

This factoring allows the setting of program elements to match a business entity's security posture representing its risk assessment inputs applied to its infrastructure and operations. The following equation illustrates the combination of risks and relationship across a program:

$$\sum_{prog}^{RA} RG = Comm_{user} + WI_{user}$$

The program is the index for the summation of risk assessment values across the relationship groups. These results of this factoring provide ordering and priority to create communication and work instruction elements based on both relevancy and criticality. These created elements are stored in an array and presented to users in priority order, as illustrated in the equation below:

$$\int_c^r \text{priority}$$

As previously described herein, the security management system 12 is configured to facilitate a closed-, or feedback-, loop process. More specifically, feedback of related efforts and progress with respect to workflow assignments, including compliance and response functions, is collected and further analyzed with integrated data to further refine output over time. The closed-loop process enables the system 12 to account for additional data associated with user actions in response to the work instructions, wherein such additional data is fed back into the system 12 and processed with business entity data and industry data to further refines the output of the system 12 over time.

Figure 4:
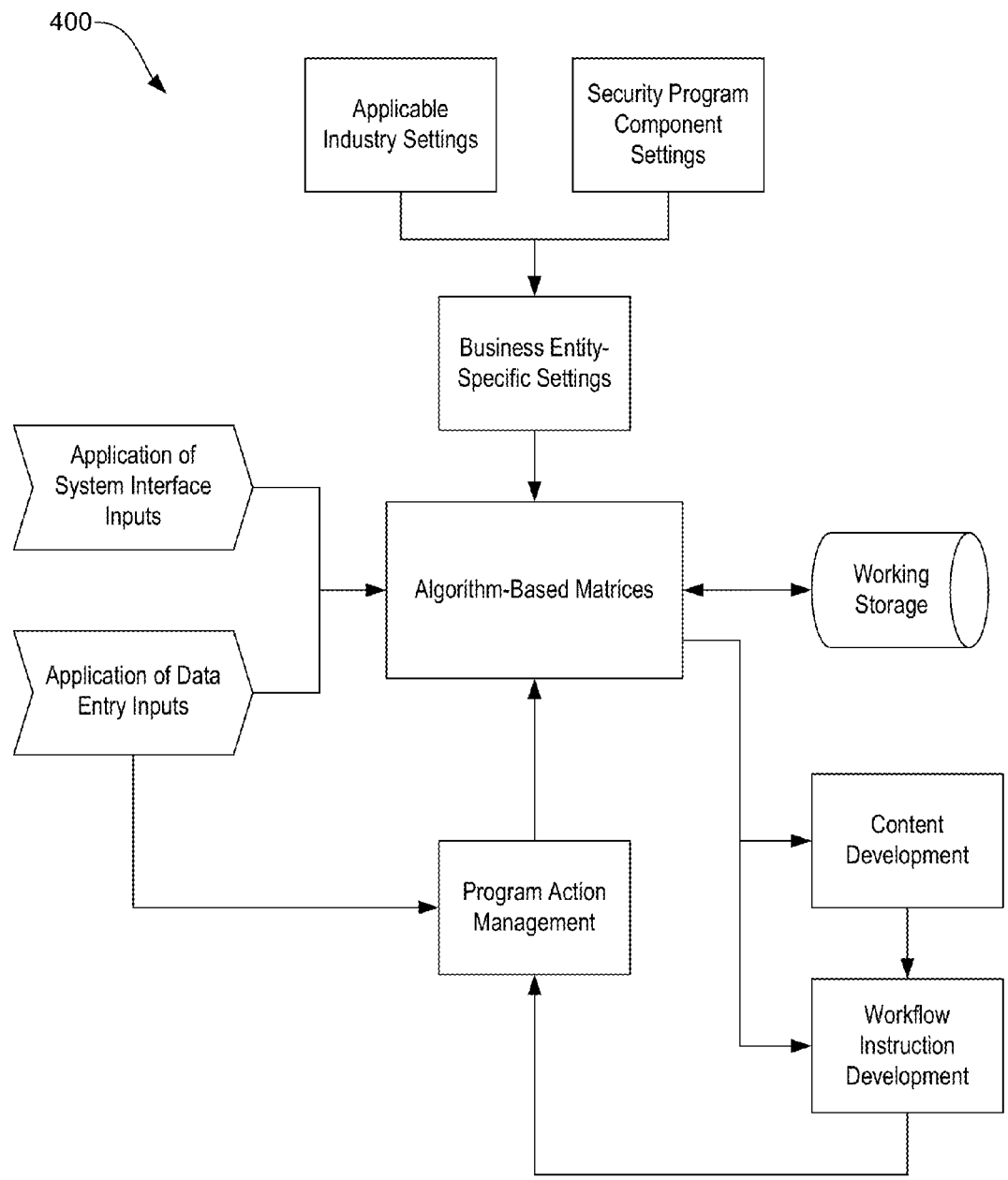
FIG. 4 is a flow diagram of a general method of providing a tailored security solution for organizing the entire breadth of an organization's security posture.

The system process flow of the system 12 of the present invention is generally illustrated in FIG. 4. As shown, the security management system 12 data processing flows that correlate disparate data, relating it to the specific business entity, and delivering it in the context of an enterprise security program. The context of data and relationship groups are driven by the business entity itself. Data relating to the business entity's compositions, services, and industry are processed to have a tailored basis to facilitate an effective security program for that particular business entity, rather than an abstract, one size fits all model. FIG. 4 generally illustrates the closed-loop nature of the system 12. More specifically, as efforts and tasks are conducted, they are fed back into the overall system processing as part of the evolving business entity specific data.

The security management system 12 of the present invention provides numerous benefits over current security systems, including providing coverage with controls and measures that span a business entity's operations, infrastructure, and people-based processes, while further accounting for industry requirements, rules, and requirements. In particular, the system 12 provides a sustainable and comprehensive security program tailored to an business entity and the industry it operates, communication and work instructions to help the business entity execute proactively and reactively to security requirements, the basis to meet compliance and industry requirements related to information security, and a closed-loop process of tracking of efforts and effectiveness to implement improvements to the security program over time. Accordingly, the system 12 supports the business entity in not only being reactive to incidents but also proactive in taking steps to minimize the risk of security incidents based on industry and specific business entity profile.

Figure 5A:
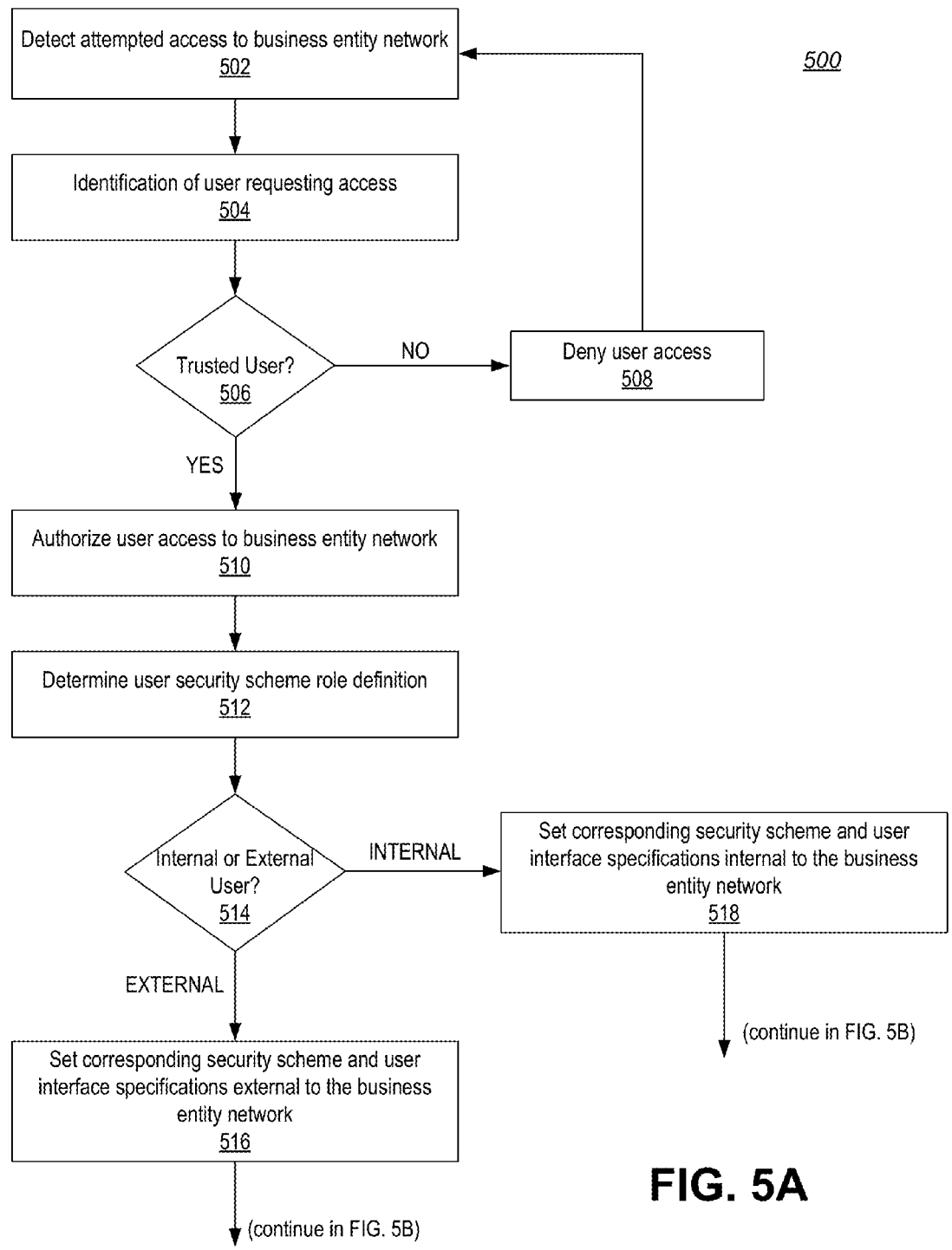
FIGS. 5A-5C are a continuous flow diagram illustrating one embodiment of a method for providing tailored security management framework for a business entity based on the business entity's operations, infrastructure, and user-based processes, as well as industry-specific rules and regulations associated with the business entity.
Figure 5B:
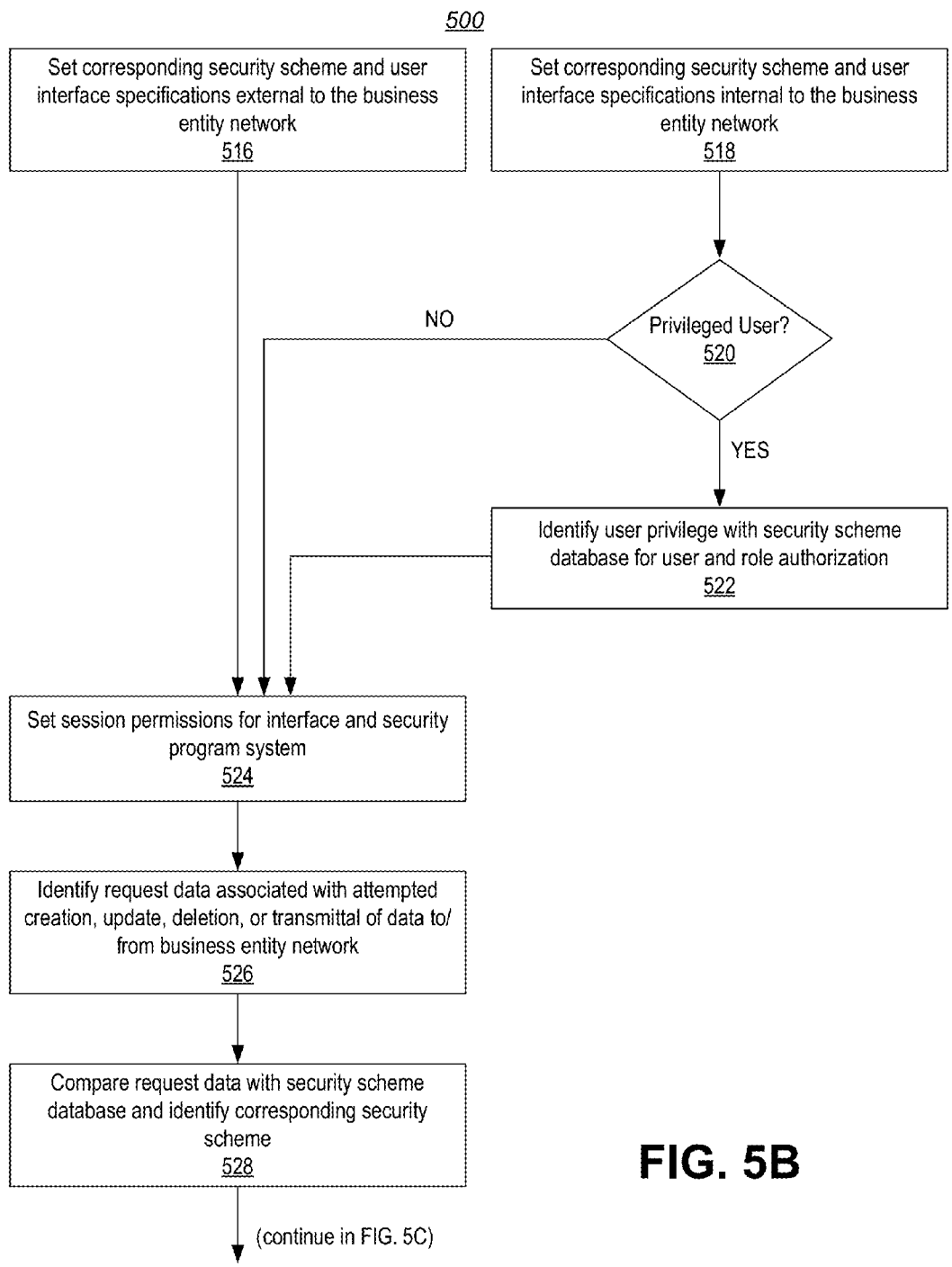
Figure 5C:
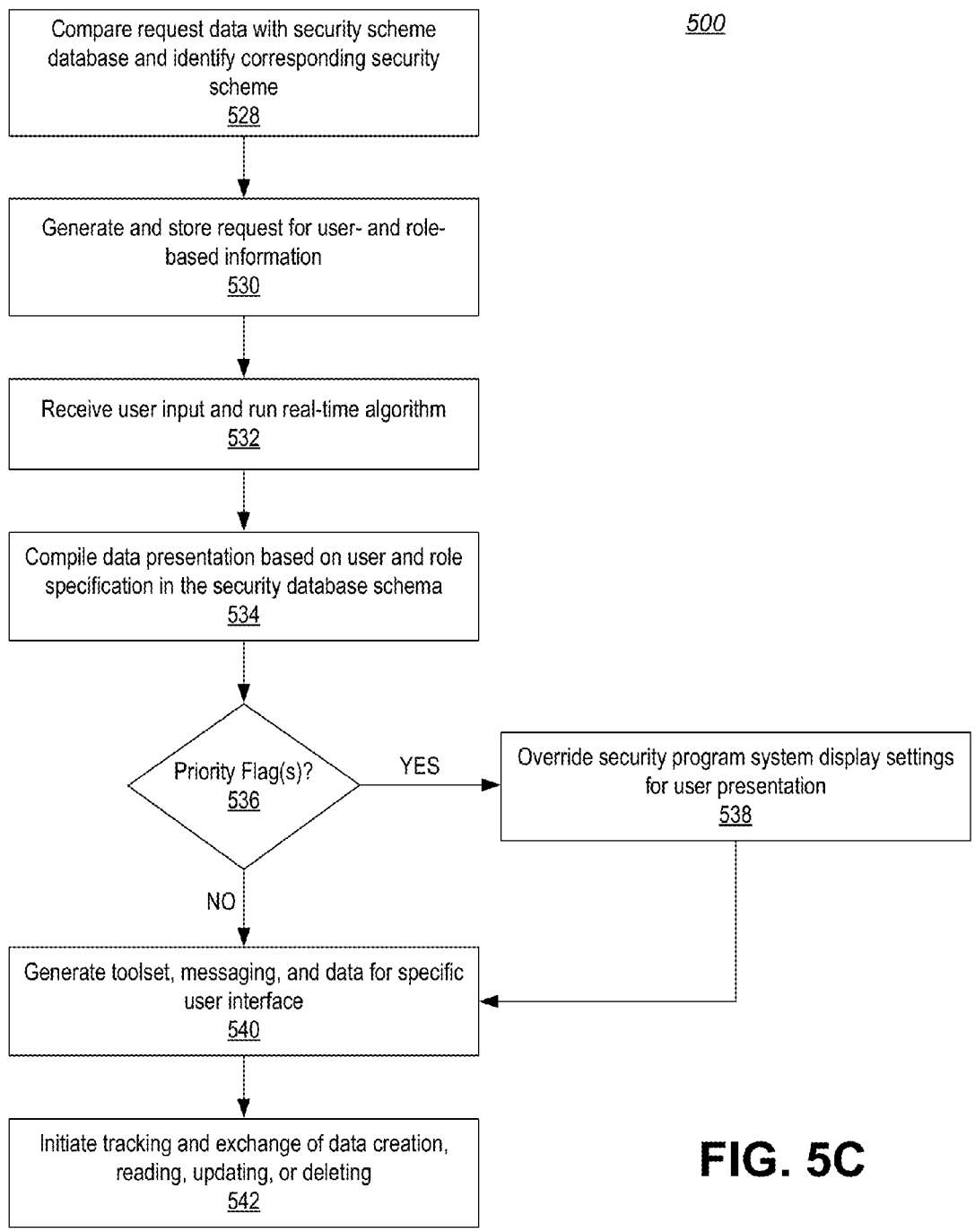

FIGS. 5A-5C provide a continuous flow diagram illustrating one embodiment of a method 500 for providing tailored security management framework for a business entity based on the business entity's operations, infrastructure, and user-based processes, as well as industry-specific rules and regulations associated with the business entity. The method 500 includes detecting an attempted access to a business entity network (operation 502). The attempted access may include a user, either internal or external to the business entity, who may wish to access the interface portal provided by the security management system 12, or otherwise access business entity data. The method 500 further includes identifying the user attempting to access the business entity network (operation 504). As part of identifying the user requesting access, the system 12 may include a verification process which may include a typical login scenario in which a user must log in to the system 12 by providing credentials (e.g., username, password, etc.), wherein the system 12 will compare the credentials with profiles stored of previously registered, or authorized users.

A determination may then be made in operation 506 as to whether the user is a trusted user. At this point, a user's credentials may be used to determine if the user is either registered with the system 12 of the business entity, or otherwise authorized to have access to the business entity. If it is determined in operation 506 that a user does not have an existing profile or account, or is otherwise not authorized and trusted to access the business entity network, the system 12 denies user access in operation 508. If it is determined in operation 506 that the user does have an existing profile or account, then the system 12 authorizes user access to the business entity network (operation 510).

The method 500 further includes determining a user security scheme role definition (operation 512), wherein a determination is made in operation 514 as to whether the user is part of an internal trusted group of users or an external trusted group of users. Accordingly, at this point, the system 12 is configured to utilize data associated with the attempted access, wherein such data may include an identity of a user requesting access, characteristics of the user requesting access, the type of access requested, the identity and characteristics of business entity data requested to be accessed, and a combination thereof. The characteristics of the user requesting access may include user credentials, user role with respect to the business entity, user assignment to one of an internal trusted group and an external trusted group, and a combination thereof. For example, as part of the authentication and access architecture, the system 12 is configured to screen a user attempting to access business entity network by verifying the credentials of the user and determining whether they are part of a trusted internal group or trusted external group. The system 12 may compare a user data with stored profiles within the trust internal and external database 32, 34, for example.

If it is determined that the user is an external user, then the system is configured to set a corresponding security scheme and user interface specifications external to the business entity network (operation 516) and the method 500 moves on to operation 524, described in greater detail herein. If, however, it is determined in operation 514 that the user is an internal user, then the system 12 is configured to set a corresponding security scheme and user interface specifications internal to the business entity network (operation 518).

A determination may then be made in operation 520 as to whether the internal user is a privileged user. A privileged user may be one who has specific authority to manage, or otherwise govern, certain security-related data (e.g., governance of security management of business entity). If it is determined that the internal user is a privileged user, then the system 12 is configured to identify one or more user privileges with security scheme database for user and role authorization (operation 522), upon which the method 500 further includes setting session permissions for interface and security program system (operation 524). If it is determined that the internal user is not a privileged user, then the method 500 moves to operation 524. The method 500 further includes identifying request data associated with an attempted creation, update, deletion, or transmittal of data to or from the business entity network (operation 526). The method 500 further includes comparing request data with security scheme database and identifying corresponding security scheme (operation 528), at which point the system 12 is then configured to generate and store request for user- and role-based information (operation 530). The system 12 then receives user input and is configured to run real-time algorithm (operation 532), in which the system 12 compiles data presentation based on user and role specification in the security schema database (operation 534).

A determination is then made in operation 536 as to whether priority flags are associated with the presentation of data. In the event that it is determined that priority flags are associated with data presentation, the system is configured to override security program system display settings for user presentation (operation 538). If it is determined that priority flags are not present, then the method includes generating toolset, messaging, and data for specific user interface (operation 540) and further initiating tracking and exchange of data creation, reading, updating, or deleting (operation 542).

Figure 6:
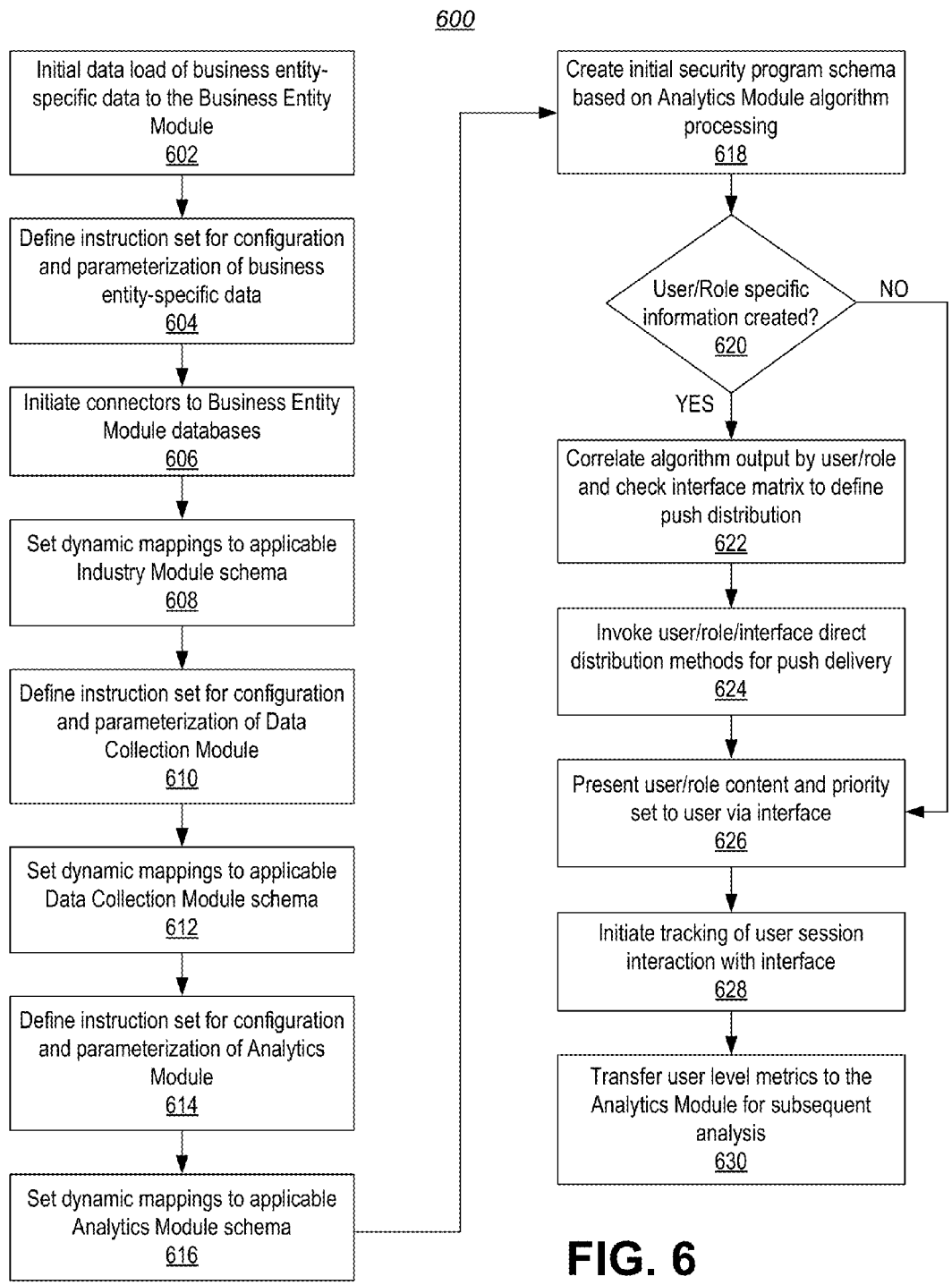
FIG. 6 is a flow diagram illustrating one embodiment of a process of system data establishment, collection, generation, and interface presentation.

FIG. 6 is a flow diagram illustrating one embodiment of a process 600 of system data establishment, collection, generation, and interface presentation. The process 600 includes an initial data load of organizational specific data to the business entity module 24 (operation 602). The process 600 further includes defining instruction set for configuration and parameterization of business entity-specific data sources from the databases (46-52) of the business entity module 24 (operation 604). The process 600 further includes initiating connectors to the business entity module 24 databases 46-52 (operation 606) and setting dynamic mappings to applicable industry module 26 schema (operation 608). The process 600 further includes defining instruction set for configuration and parameterization of the data collection module 28 (operation 610) and setting dynamic mappings to applicable data collection module schema (operation 612). The process 600 further includes defining instruction set for configuration and parameterization of analytics module 30 (operation 614) and setting dynamic mappings to applicable analytics module 30 schema (operation 616). At this point, the process 600 includes creating initial security program schema based on analytics module 30 algorithm processing (operation 618), as previously described herein.

A determination is then made in operation 620 as to whether user/role specific information was created. If it is determined in operation 620 that user/role specific information was created, then the process 600 moves to correlating algorithm output by user/role and check interface matrix to define push distribution with the security program system 22 (operation 622) and invoking user/role/interface direct distribution methods for push delivery (operation 624). The process 600 further includes presenting user/role content and priority set to user via interface 20 (operation 626). If it is determined in operation 620 that user/role specific information was not created, then the process continues with operation 626, thereby bypassing operations 622 and 624. The process 600 further includes initiating tracking of user session interaction with interface 20 by way of the security program system 22 (operation 628) and transferring user level metrics to the analytics module 30 for subsequent analysis (operation 630).

Figure 7:
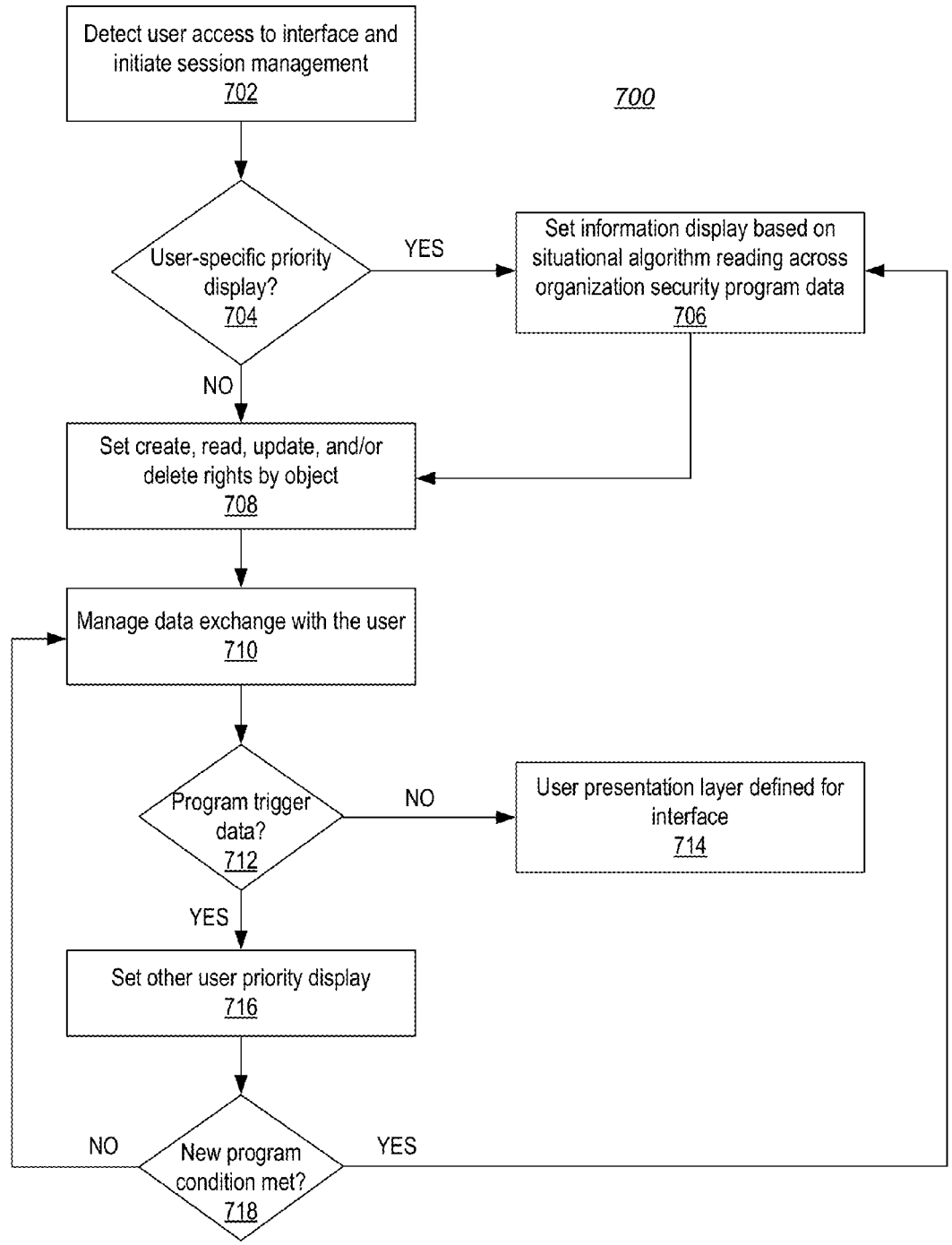
FIG. 7 is a flow diagram illustrating one embodiment of a process of user and system exchange of data consistent with the present disclosure.

FIG. 7 is a flow diagram illustrating one embodiment of a process 700 of user and system exchange of data consistent with the present disclosure. The process 700 includes detecting user access to interface 20 and initiating session management with the security program system 22 (operation 702). A determination is then made in operation 704 as to whether the display is to be user-specific based on priority. If it is determined in operation 704 that presentation on the interface is to be a user-specific priority display, then the security program system 22 is configured to set information display based on situational algorithm reading across organization security program data (operation 706) and the security program system 22 is configured to set create, read, update, and/or delete rights by object (operation 708). If it is determined in operation 704 that presentation on the interface is not to be user-specific priority display, then process 700 bypasses operation 706 and continues to operation 708.

In operation 710, the security program system 22 is configured to manage data exchanged with the user during their session on the interface 20. A determination is then made in operation 712 as to whether to program trigger data. If it is determined that trigger data is not to be programmed, the user presentation layer is defined for the user interface 20 (operation 714). If it is determined in operation 712 that trigger data is to be programmed, the security program system 22 is configured to set other user priority display (operation 716), at which point a determine is then made in operation 718 as to whether the new program condition is met. In the event that the new program condition is met, then process continues back to operation 706. If the new program condition is not met, then the process continues back to operation 710.

Figure 8:
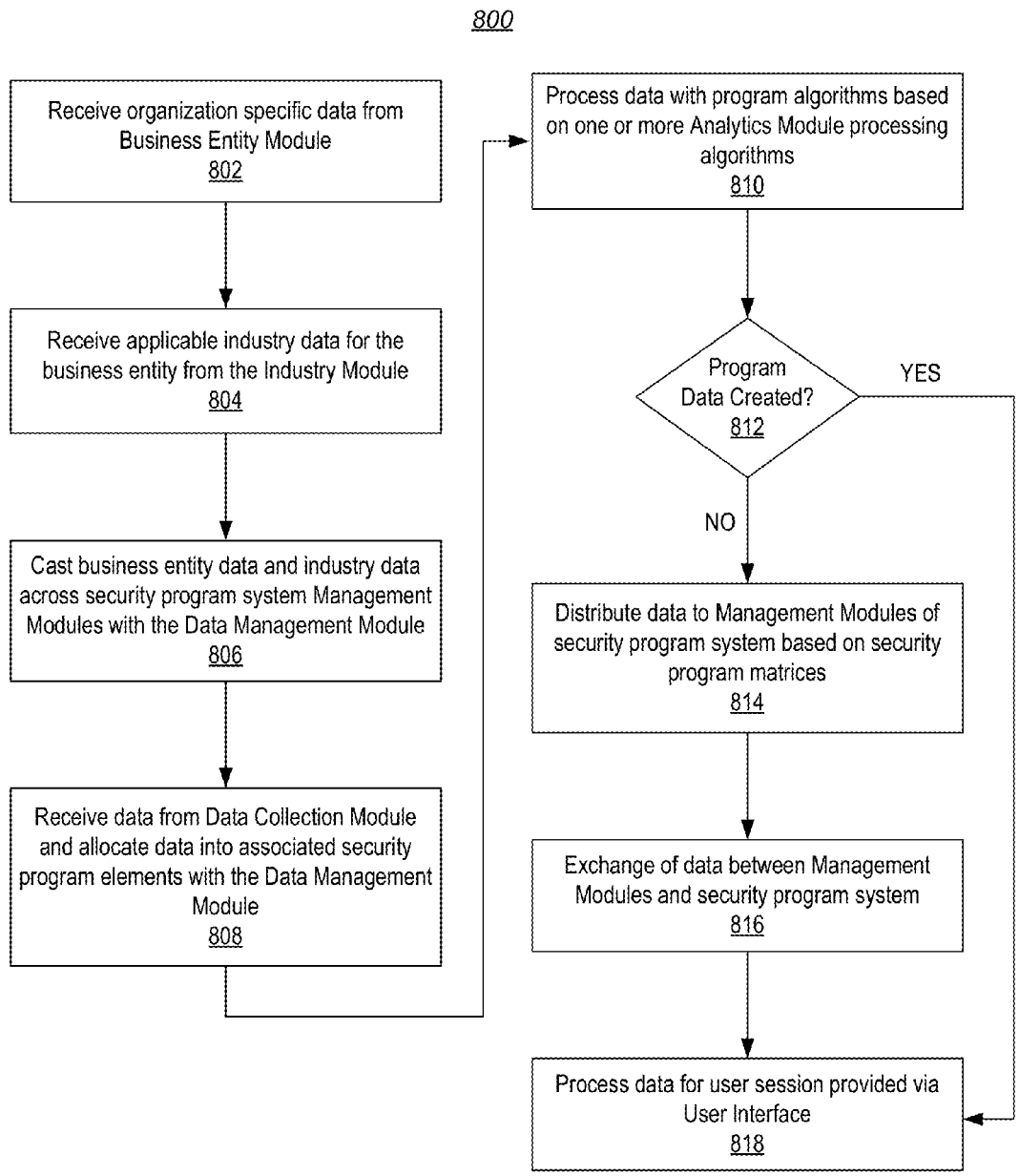
FIG. 8 is a flow diagram illustrating one embodiment of the flow of data management of the system of the present disclosure.

FIG. 8 is a flow diagram illustrating one embodiment of the flow 800 of data management of the system of the present disclosure. The flow 800 includes the security program system 22 receiving organization specific data from the business entity module 24 (operation 802) applicable industry data for the organization from the industry module 26 (operation 804). The data management module 36 then casts business entity data and industry data across security program system 22 management modules (38-44) (operation 806). The security program system 22 then receives data from data collection module 28 and allocates data into associated security program elements with the data management module 36 (operation 808). The security program system 22 then process data with program algorithms based on one or more analytics module 30 processing algorithms.

A determination is then made in operation 812 as to whether program data is created. If it is determined that program data is not created, then the data management module 36 distributes data to the associated management modules 38-44 of the security program system 22 based on security program matrices (operation 814), the management modules 38-44 exchange data with the security program system 22 (operation 816), and the security program system 22 processes data for user session provided via the user interface 20 (operation 818). If it is determined in operation 812 that program data is created, then the flow 800 proceeds on to operation 818 and bypasses operations 814 and 816.

Figure 9:
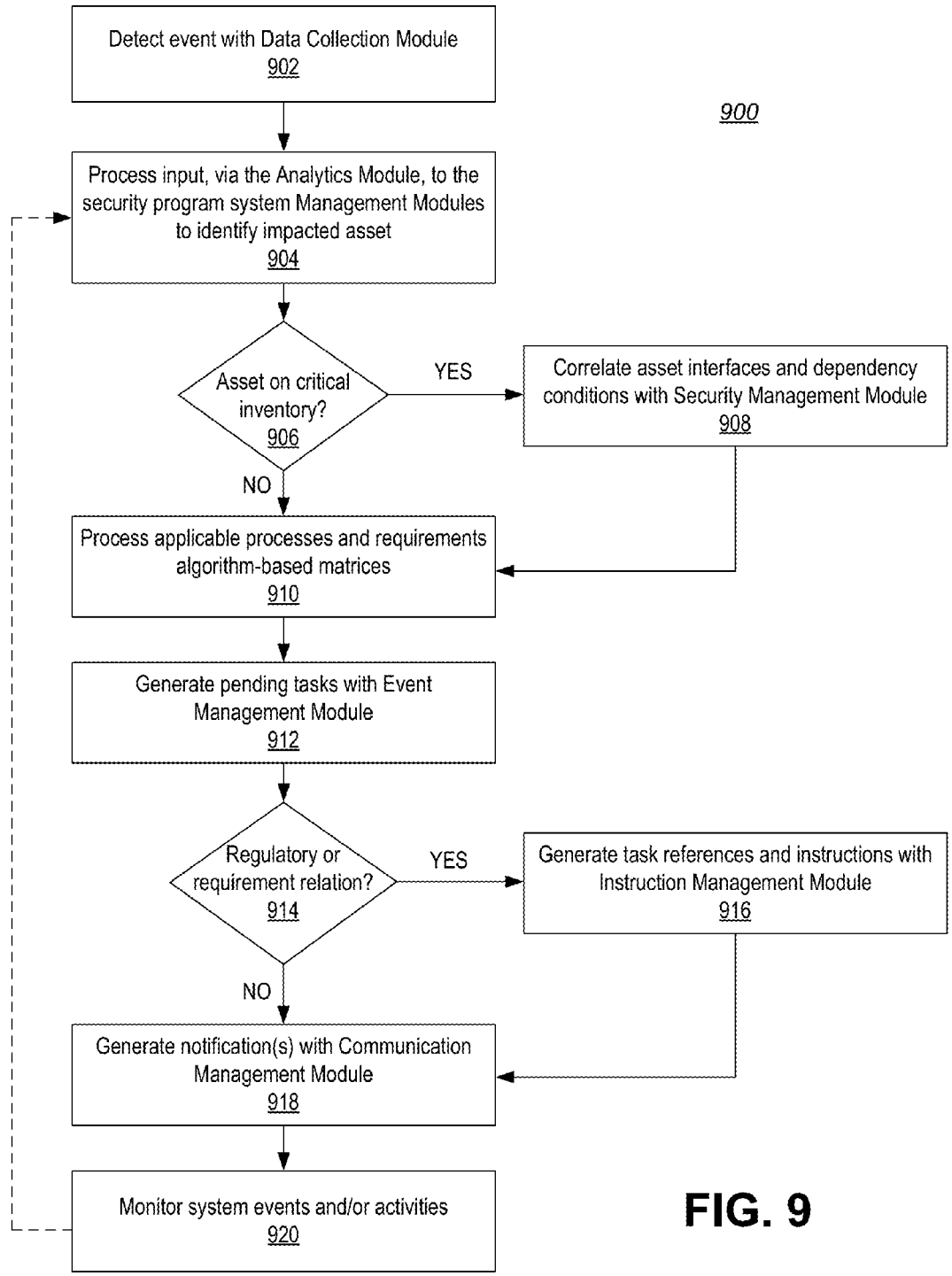
FIG. 9 is a flow diagram illustrating an exemplary incident response process provided by the system of the present disclosure, including the correlating of information about potential threats and requirements for a given industry based on the incident with information about an organization and the people within it and producing communications and tasks to prevent or address incident based on the correlated data.

FIG. 9 is a flow diagram illustrating an exemplary incident response process 900 provided by the system of the present disclosure, including the correlating of information about potential threats and requirements for a given industry based on the incident with information about an business entity and the people within it and producing communications and tasks to prevent or address incident based on the correlated data. The incident generally relates to the potential compromise of confidential information stored within a drive that has been lost, or is otherwise missing. Thus, the exemplary scenario deals with asset protection.

The process 900 includes detecting an event through the data collection module 28 (operation 902). The event may generally include an incident created in an incident management component of the portal provided be the security management system 12 of the present disclosure. More specifically, in the present scenario, the incident be related to a drive containing confidential information that has gone missing. The dive may include, for example, backup data containing customer information, deposit account information, and card data that was sent to the cold back-up site hosted by a third party vendor. The process 900 further includes processing input, via the analytics module 30, to the management modules 38-44 of the security program system 22 so as to identify the impacted asset (operation 904).

A determination is then made in operation 906 as to whether the asset is on a critical inventory. If it is determined that the asset is critical, then the security management module 38 correlates asset interfaces and dependency conditions (operation 908) and the security program system 22 then processes applicable processes and requirements algorithm-based matrices (operation 910). Based on the asset that is missing, the security program system 22 uses algorithms to create a matrix of people, applications, data, compliance requirements, and processes related to the asset and aligned it to the business entity's security program. In the event that it is determined in operation 906 that the asset is not critical, then the process 900 flows to operation 910, thereby bypassing operation 908.

The process 900 further includes generate pending tasks with the event management module 40 (operation 912). A determination is then made in operation 914 as to whether there is an industry-specific regulation, rule, or requirement relation to the incident. If it is determined that there is an industry-specific regulation, rule, or requirement associated, or otherwise applicable to the incident, then the instruction management module 44 generates task references and instructions (operation 916) and the communication management module 42 generates notifications to provide to a specific end user for receiving the instructions and/or notifications (operation 918). The security program system 22 utilizes the algorithm matrix to define an event and create notifications and tasks. If it is determined in operation 914 that there is no applicable industry-specific regulation, rule, or requirement, then the process 900 continues to operation 918, thereby bypassing operation 916. The process 900 further includes monitoring system events and/or activities with the security program system 22 (operation 920). Accordingly, the system 12 is configured to utilize a closed-loop process to provide feedbacks of related efforts and progress, including compliance and response functions generated by the system based on industry and current threat conditions.

While FIGS. 5A-5C and 6-9 illustrate method operations according various embodiments, it is to be understood that in any embodiment not all of these operations are necessary. Indeed, it is fully contemplated herein that in other embodiments of the present disclosure, the operations depicted in FIGS. 5A-5C and 6-9 may be combined in a manner not specifically shown in any of the drawings, but still fully consistent with the present disclosure. Thus, claims directed to features and/or operations that are not exactly shown in one drawing are deemed within the scope and content of the present disclosure.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Figure 10:
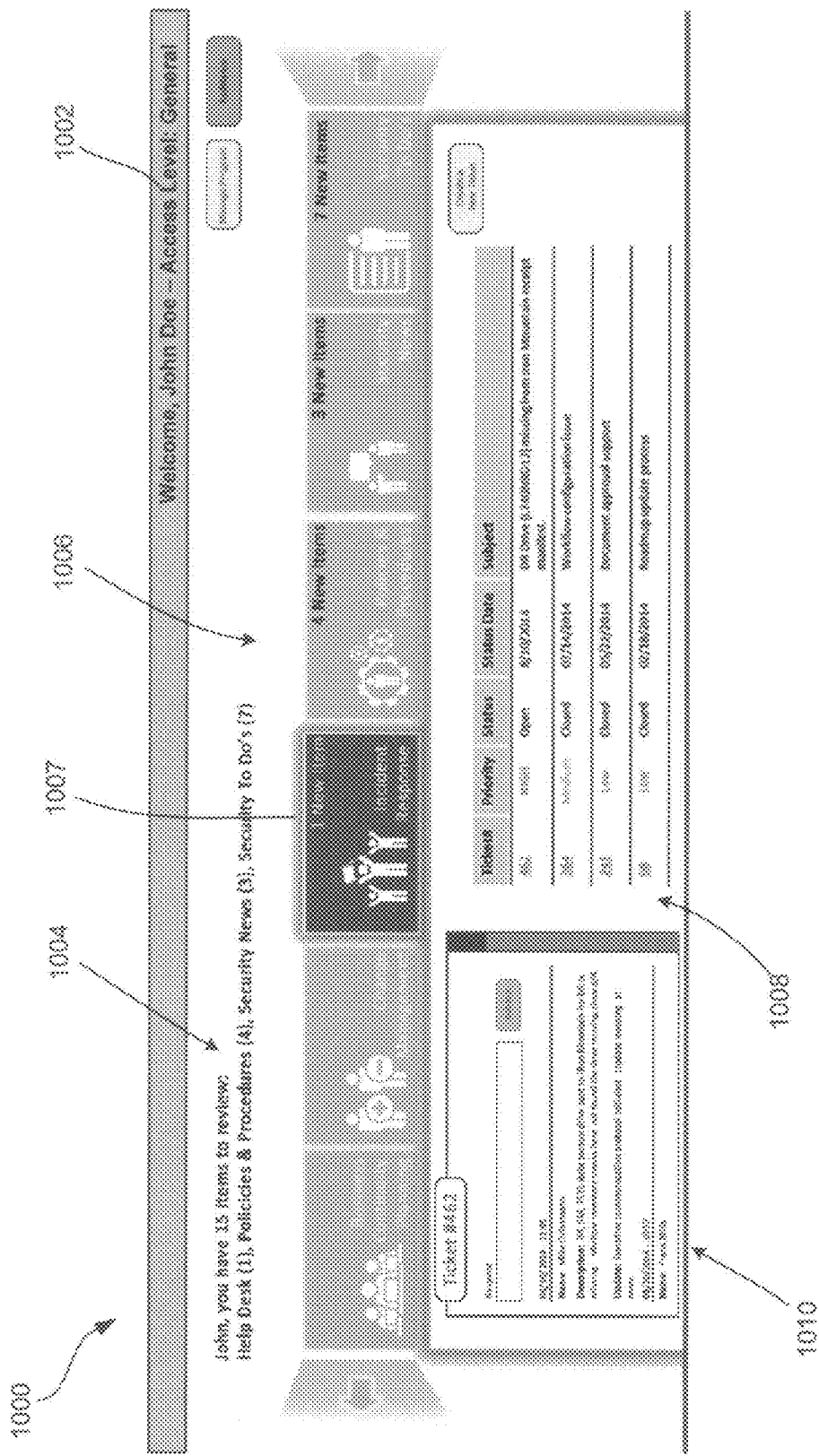
FIG. 10 is a screenshot of an exemplary portal home screen, or landing page, provided by the system interface which may be tailored to a specific user for presenting security-related information, as well as security posture management tools and options.

FIG. 10 is a screenshot of an exemplary portal home screen 1000, or landing page, provided by the system interface which may be tailored to a specific user for presenting security-related information, as well as security posture management tools and options. As generally understood, the platform or interface is in the form of an interface (e.g., but not limited to graphical user interface (GUI)) provided on the user's computing device through which a user may interact with the system 12.

As shown, the portal 1000 generally provides an initial banner 1002 in which a user's identity and access level may be presented. As will be described in greater detail herein, the system 12 generally provides a role-based access model for the portal 1000, in which the portal interfaces are tailored for each individual user providing them with easy and streamlined access to the things they need to be accomplished. The individual user interfaces are execution focused, similar to the data and information that drive them.

The portal 1000 is configure to provide fresh, updated content with each visit that is designed to facilitate action and accomplishment of tasks and workflows. For example, upon accessing the interface 20 the portal 1000, a user may be presented with notifications 1004, which may include new content, task attention, workflow attention, and consultation response. Accordingly, the notifications 1004 generally provide a user with a quick reference to the action items that require their attention. The portal 1000 further provides user interfaces designed to provide easy and ready access to the tools 1006 most commonly used by a particular user. The tool 1006 are generally user-specific access management tools for allowing a user to navigate various aspects of the security management system 12. The notifications 1004 and tool 1006 are generally displayed based on priority or prominence, those items needing action or attention, while other tools and functions are available when needed. As shown, a user may select incident response tool, as indicated by 1007. Upon initiating the incident response tool, the portal may present specific information related to a particular ticket generated for an incident, as indicated by arrow 1010, in which a user may response to the ticket. Furthermore, the portal 1000 may provide an overview or history of tickets (both outstanding and completed), in which the user may sort the tickets based on priority, status, data, and subject, for example.

Accordingly, the portal 1000 provides consistent access to data and information that a specific user is permitted to have access to. For example, user access to data may be limited based on user credentials (e.g., role-based access). Accordingly, some users may have a lower role in the business entity and may be considered a general user and provided access to data having a low clearance level associated therewith (little or no criticality). Some users, such as executives or administrators, as well as IT staff, may have a higher role in the business entity and thus may have access to high clearance level type data (critical information), as well a management tools. Accordingly, presentation of information on the platform or interface is focused on the required actions and information generated related to those actions under the enterprise security program to support the user in completing actions without putting the burden on the user to find items that need attention.

In one embodiment, the system 12 may utilize four different user groups, including general users, executive users, security users, and key third parties. General users generally make up most of the business entity and may have a general level of access, while executive users are provided with accountability for security efforts and security users have responsibility for security efforts. Key third parties may have access to or play a significant role in the business entity. Accordingly, the system 12 generally provides a role-based access model for the portal 1000, in which the portal interfaces are tailored for each individual user providing them with easy and streamlined access to the things they need to be accomplished. The individual user interfaces are execution focused, similar to the data and information that drive them.

Figure 11:
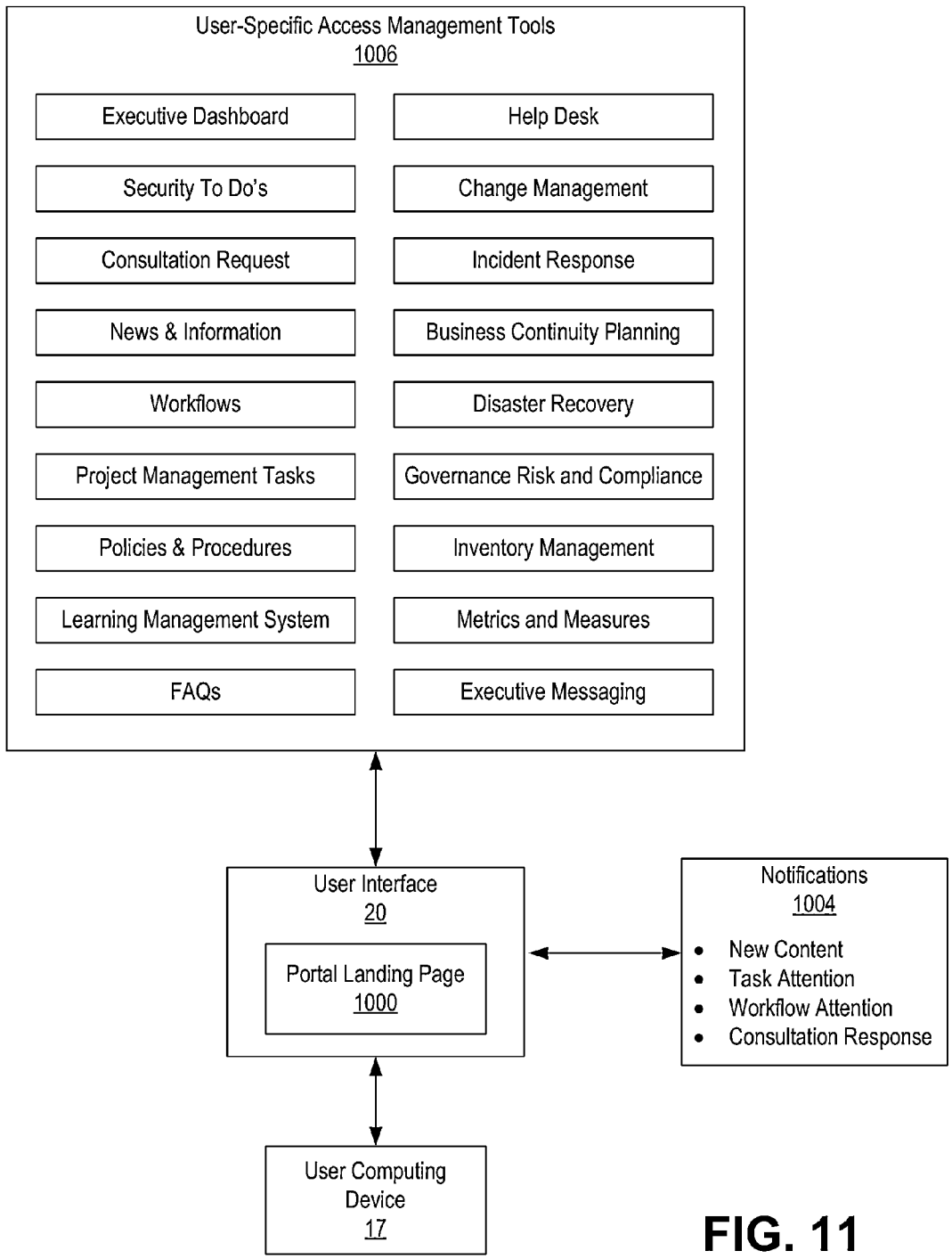
FIG. 11 is a block diagram illustrating notifications and user-specific access management tools provided to a user via the interface.

FIG. 11 is a block diagram illustrating notifications and user-specific access management tools 1006 provided to a user via the interface. The tools 1006 may include, in no particular order, Executive Dashboard, Security To Do's, Consultation Request, News & Information, Workflows, Project Management Tasks, Policies & Procedures, Learning Management System, FAQs, Help Desk, Change Management, Incident Response, Business Continuity Planning, Disaster Recovery, Governance Risk and Compliance, Inventory Management, Metrics and Measures, and Executive Messaging.

The portal 1000 generally provides the tool 1006 based on a user's role. Thus, the portal 1000 only provides those tools associated with, or otherwise assigned to, a particular role. Thus certain management tools available to an executive or security user will not be available to a general user. The following is a description of the functions and interfaces for each of the roles (general, executive, security, and third-party). General user functions and interfaces are geared towards general security information and awareness. General information, tools, and function are designed to bolster a culture of security in the business entity. Tools to manage key global initiatives such as Training, Change Requests, and Business Continuity/Disaster Recovery are available to General Users with access controls to manage the scope of access. Executive Users are provided oversight and governance tools to support accountability for security program efforts. Execution focused displays help managers and executives keep track of the program and assess overall direction and priorities. For those accountable for security across the enterprise, the portal 1000 provides enterprise level oversight and governance tools fully integrated with execution efforts being worked through the portal 1000. Oversight tools are execution focused with communication and collaboration capabilities directly with those user responsible for efforts. Data driven displays use real-time data with the ability to drill into details.

Security Users are generally those with responsibility for various facets of a business entity's security program. Given the responsibility levels of Security Users, access to tool functions support these roles with ability to manage content and parameters in the system. Designed to provide full feature program implementation and operations functions, the Security User suite of tools and functions give Security users a centralized enterprise program management system. Security users can manage execution of security initiatives and interface with the entire business entity. Integrated reporting streamlines communications with stakeholders and executives. The Symphony Security Portal provides Security Users will all the functions and tools needed to meet compliance objectives, take a proactive stance toward threats, and manage a sustainable security program.

Key third parties are able to share data and information, and collaborate on security program activities in a secure and controlled manner. Functions to support audit rights, supplier control validation and coordination on key efforts such as disaster recovery are provided. Recent regulatory changes in the medical and financial industries, as well as recent breaches in the retail sectors have cast greater scrutiny on vendor relationships. The portal 1000 provides controlled access for vendors to work with the business entity in a more integrated fashion. It provides mechanisms for more collaboration and coordination on dealing with security threats and incidents. Functions are provided to better manage contractual rights and terms and in place, including operational level components like service level agreements (SLAs) and key performance indicators (KPIs).

Figure 12:
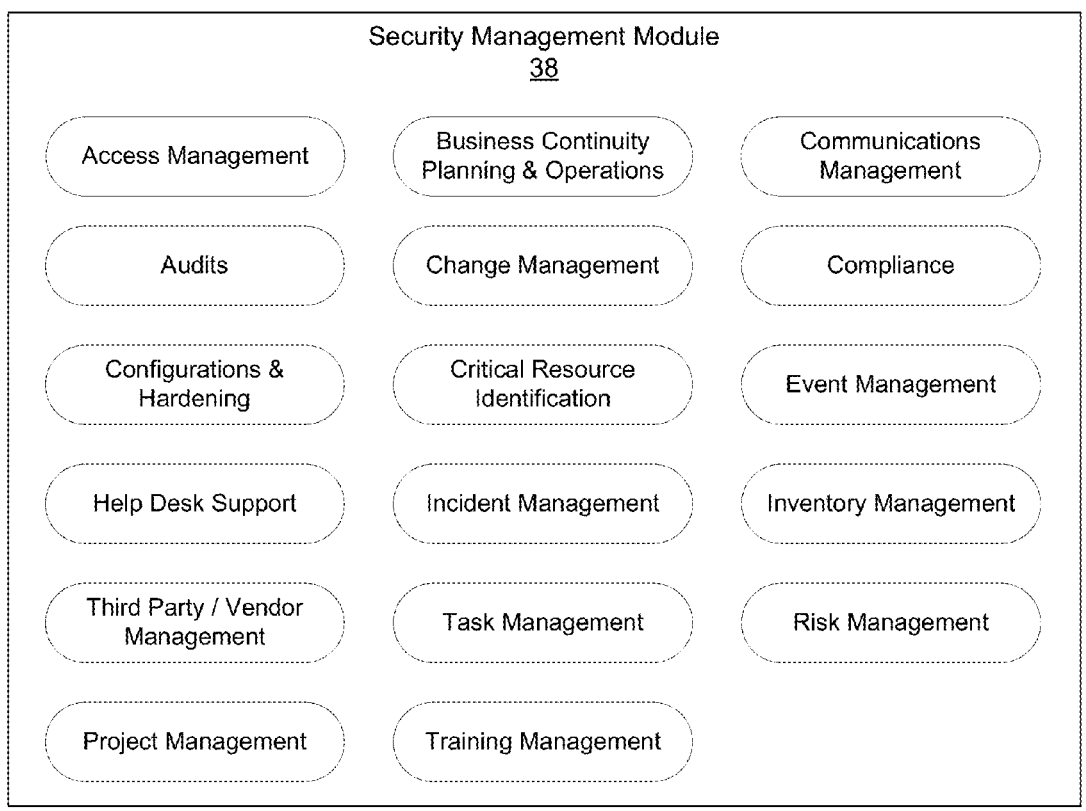
FIG. 12 is a block diagram illustrating security program components for providing a user with navigation tools and options via the interface.

FIG. 12 is a block diagram illustrating security program components for providing a user with navigation tools and options via the interface. The security management module 38 is configured to organize system functions and data into security functions support a plurality of security program components for providing users, via the user interface 20 and portal 1000, with visibility to security-related information as well as the ability to track, oversee, and govern the entire security framework of the business entity, thereby improving visibility of an business entity's current security status. The security program components may include, but are not limited to, Access Management, Audits, Business Continuity, Change Management, Communications Management, Compliance, Configurations and Hardening, Critical Resource Identification, Event Management, Help Desk Support, Incident Management, Inventory Management, Third Party/Vendor Management, Task Management, Risk Management, Project Management, and Training Management. The related description of the security program components listed above, as well as other portal tools or functioning components is provided in Table 1, below:

TABLE 1

Portal Function Summary

| Category Name | Description |
|---|---|
| Access Management | Monitoring and notification of changes to access configurations and/or use of access as indications of potential attacks. |
| Audits | Performance and design audit definition, planning, and implementation functions. Tools to leverage previous data and combine efforts to address multiple audit requirements simultaneously. |
| Business Continuity | Manage currency and distribution of key business continuity information and coordination activities. Key interface to contingency systems and infrastructure. |
| Change Management | Ensure readiness and manage the process to evaluate, test, prep, and deploy changes into the operational environment. |
| Communications Management | In a world of social media, control of messaging and communications are more critical than ever. Tools to track communications and provide employees with the data and information they need when they need it. |
| Compliance | Manage what must be done versus what could be done. Leverage duplication across different programs to streamline efforts and maintain demonstrations of compliance over time. |
| Compliance Requirements | Organize requirements to identify levels of compliance requirements, duplication across programs and ways to leverage economies of scale with efforts. |
| Configurations/Hardening | Track and manage configurations and hardening procedures in test and production environments with notifications of variance and overdue items. |
| Consultation Request | Need help or guidance? Support for your security program from NCG's security consultants that can leverage your specific data and information. |
| Critical Resource Identification | Designation and monitoring of the most critical resources across the enterprise governing response and escalation procedures and protocols. |
| Decision Support | Delivery of fact based data to support collaborative decision making within a framework to support escalation and information sharing. |
| Event Identification | How long would does it take to know you are under attack? To identify events decision makers require real time assessment data from multiple sources. |
| Executive Dashboard | Broad scope, high level reporting with drill down capability to match areas of accountability aligned with specific executives. |
| FAQs | Repository of frequently asked questions with tracking of use and automated ranked to best provide information to particular user communities. |

TABLE 1-continued

Portal Function Summary

| Category Name | Description |
| --- | --- |
| Help Desk | Ticketing system for user issues and management of resolution actions. Mining of tickets to determine trends and patterns requiring training or other remediation steps. |
| Incident Management | Framework to categorize and management incidents with tools for communication, coordination, and escalation. |
| Inventory Management | Automated tracking of connected resources and correlation with asset control lists. Track inventory at the same time validating hardening and control measures. |
| Key Third Party Management | Track interfaces and configurations controlling and monitoring direct interfaces with key third parties for data flows and access. |
| Mergers & Acquisitions | Deal planning, deal structuring and integration services, and deployment management tools to share and collaborate on key data and information. |
| News & To Do's | Sharing of timely information and updates, as well as reminders of needed actions. |
| Policies & Procedures | Develop, maintain, distribute, and track review of key policies and procedures to meet compliance requirement manage information flows across the enterprise. |
| Risk Assessments | Conduct risk assessment, streamlining data collection and business entity with the portal's assessment management systems across compliance areas. |
| Risk Management | Full life cycle risk management that starts with threat and hazard identifications, analysis, and assessment; then supports management and validation execution. |
| Roadmap/Project Management | Prioritize and track efforts, tying them back to assessment or program requirements for traceability and applying sound project management controls. |
| Task Coordination | Define, track, and assign tasks to manage resources and work through contention and conflicts. |
| Total Cost of Ownership | Track TCO including maintenance and operational costs throughout the life cycle. Validate cost management efforts, as well as support and operations efficiencies. |
| Traffic Monitoring | Monitor real time traffic and access and evaluate anomalies from expected models and frameworks to trigger alerts and escalations based on your specific business entity. |
| Training | Online user training with progress and completion tracking. Personnel and manager notification of accomplishment and pending actions. |
| User Level Connecting the pieces | Security is accomplished through multiple channels, processes, and parts of the business entity. The Symphony Security Portal brings all the pieces together into one clear picture for a specific user level: general, security, key third party, or executive |
| Vendor Management | Define and track vendor requirements for security, confidentiality, privacy, audit rights, and supplier controls. Monitor SLAs, KPIs, and capture roles and responsibilities. |
| Workflows | Define custom workflows to match your business entity and business processes, with participant notifications and dashboard views to look across workflows in process to assess progress and bottlenecks. |

FIGS. 13-17 are screenshots of the interface provided by the system illustrating various steps in an exemplary incident response scenario in which a specific users are provided with required information (e.g., workflow assignments) for addressing the incident. The incident response interface of FIGS. 13-17 relate to the incident response scenario exemplified in the flow diagram of FIG. 9. Accordingly, the incident generally relates to the potential compromise of confidential information stored within a drive that has been lost, or is otherwise missing.

Figure 13:
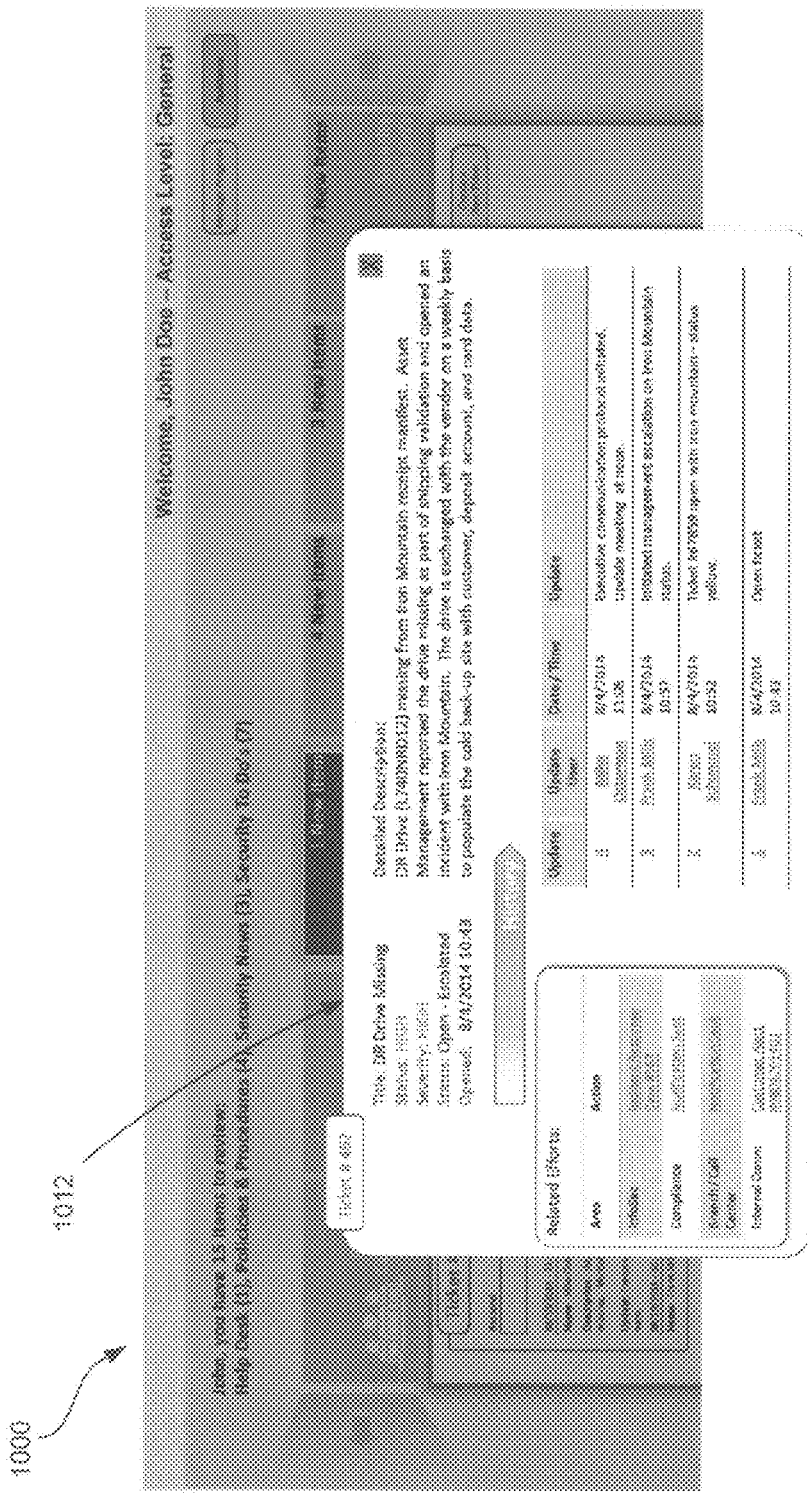
FIGS. 13-17 are screenshots of the interface provided by the system illustrating various steps in an exemplary incident response scenario in which a specific users are provided with required information (e.g., workflow assignments) for addressing the incident.
Figure 14:
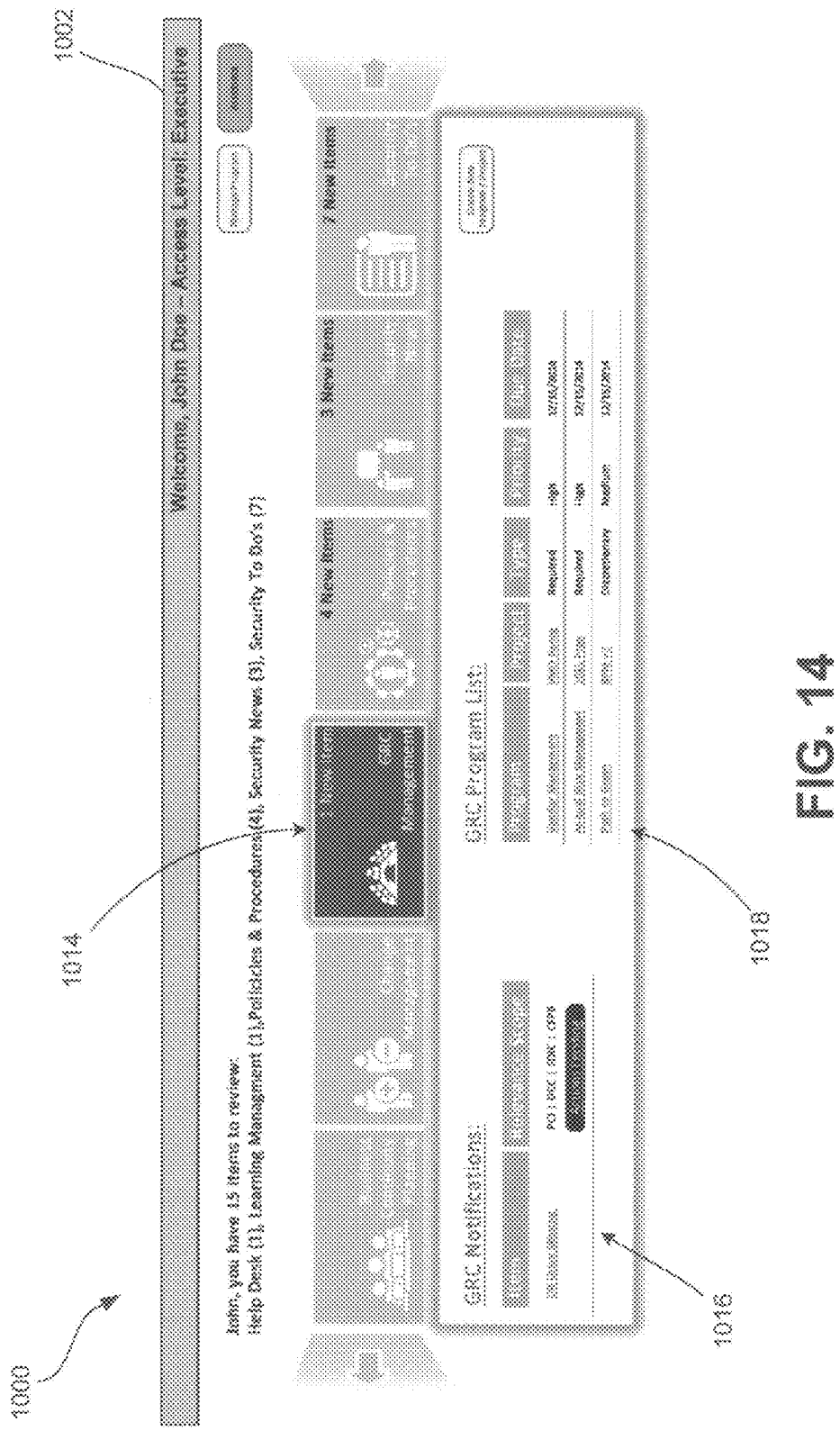
Figure 15:
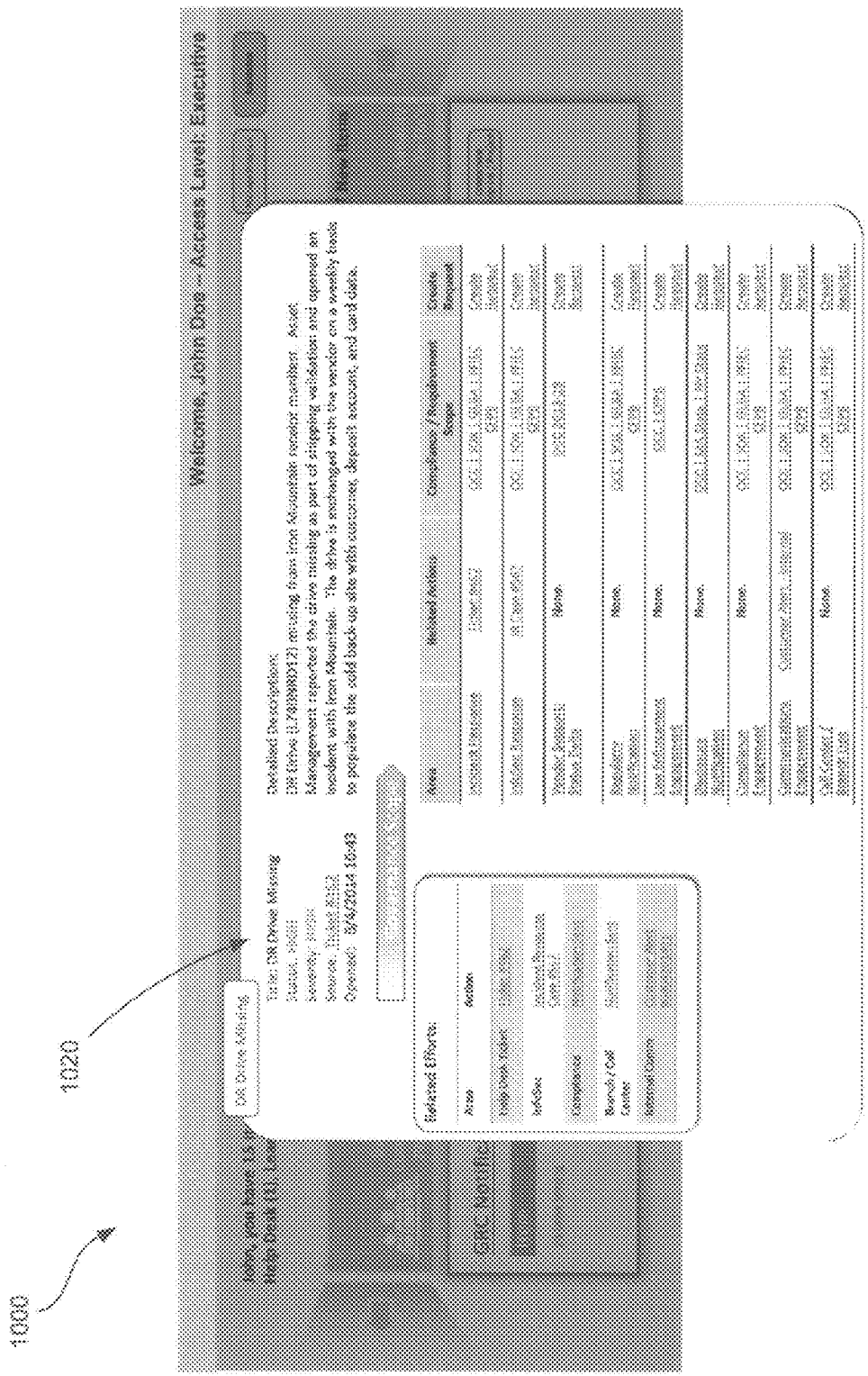
Figure 16:
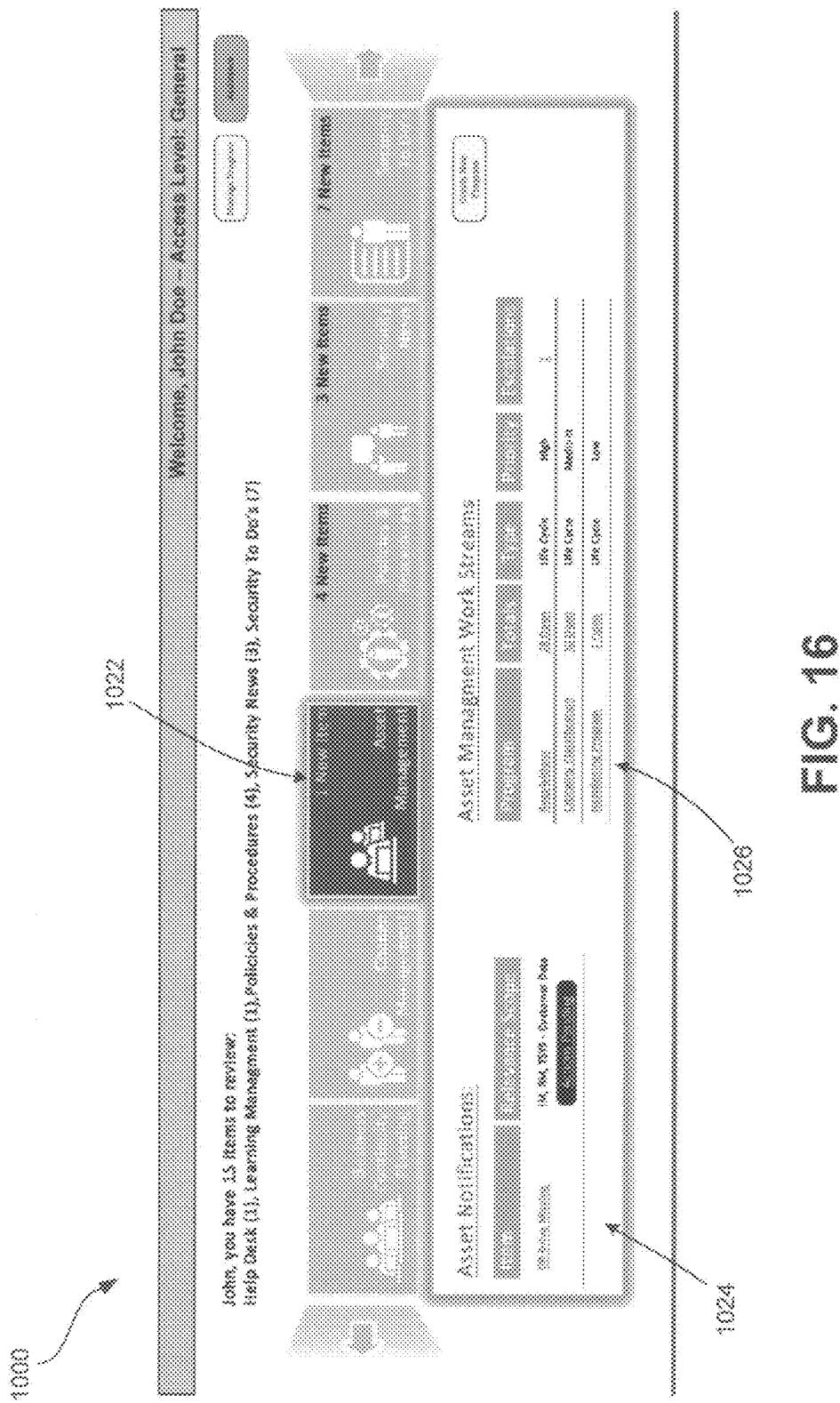
Figure 17:
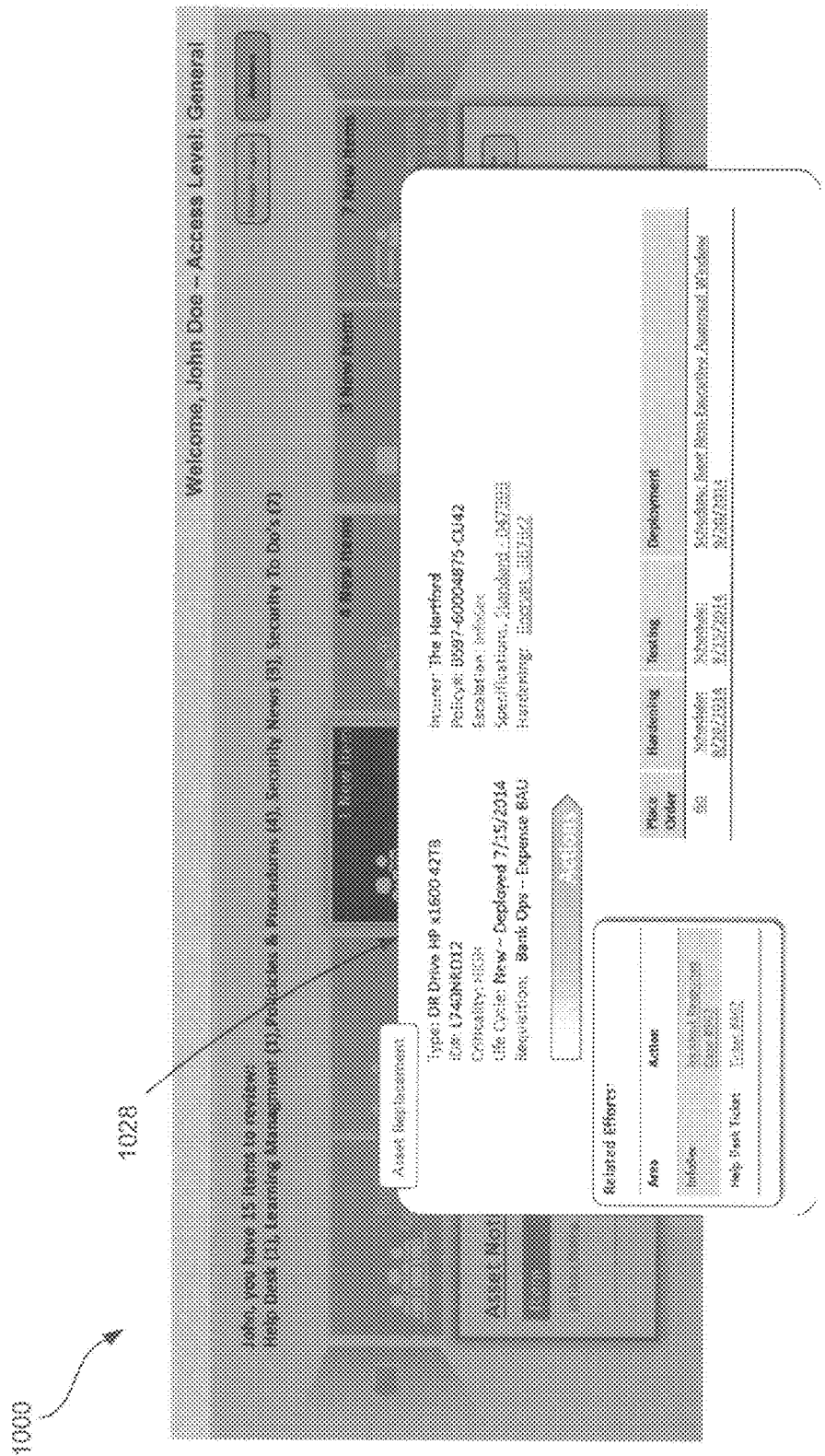

As shown in FIG. 13, the portal 1000 provides a view of a ticket (ticket #462) with supporting details 1012. The details may generally include all information relevant to the incident. In the current scenario, the description of the incident is provided (e.g., missing drive and the details surrounding the data stored on the drive and handling of such data between users, either internal or external). The details 1012 further include the status, severity, related efforts, and those users involved in the incident, either reporting the incident or notified to take actions for addressing the incident. In FIG. 14, when a condition is met, the system 12 is configured to generate data across the system. Since this incident may involve National Provider Identifier (NPI) standards, the governance risk and compliance function (GRC) is notified. Thus, in this instance, an executive user (see 1002 banner) is notified and is able to utilize the GRC tool 1014 (specific to executive users) to provide those users with the regulatory references and tools 1016, 1016 to manage responses. FIG. 15 provides a view of the GRC function 1020, providing details of the incident, as well as related actions to be taken, the specific industry compliance or requirement scope, and the ability to create requests to address the incident. In addition to the primary event items, supporting actions like asset management (e.g., replacement of the missing drive) is shown in the interface of FIG. 16. The asset management tool 1022 may provide a user with various details regarding existing asset notifications 1024 and current asset work streams 1026. As shown in FIG. 17, a user may utilize the asset management tool to accomplish the action of replacing and deploying a new drive 1028.

Figure 18:
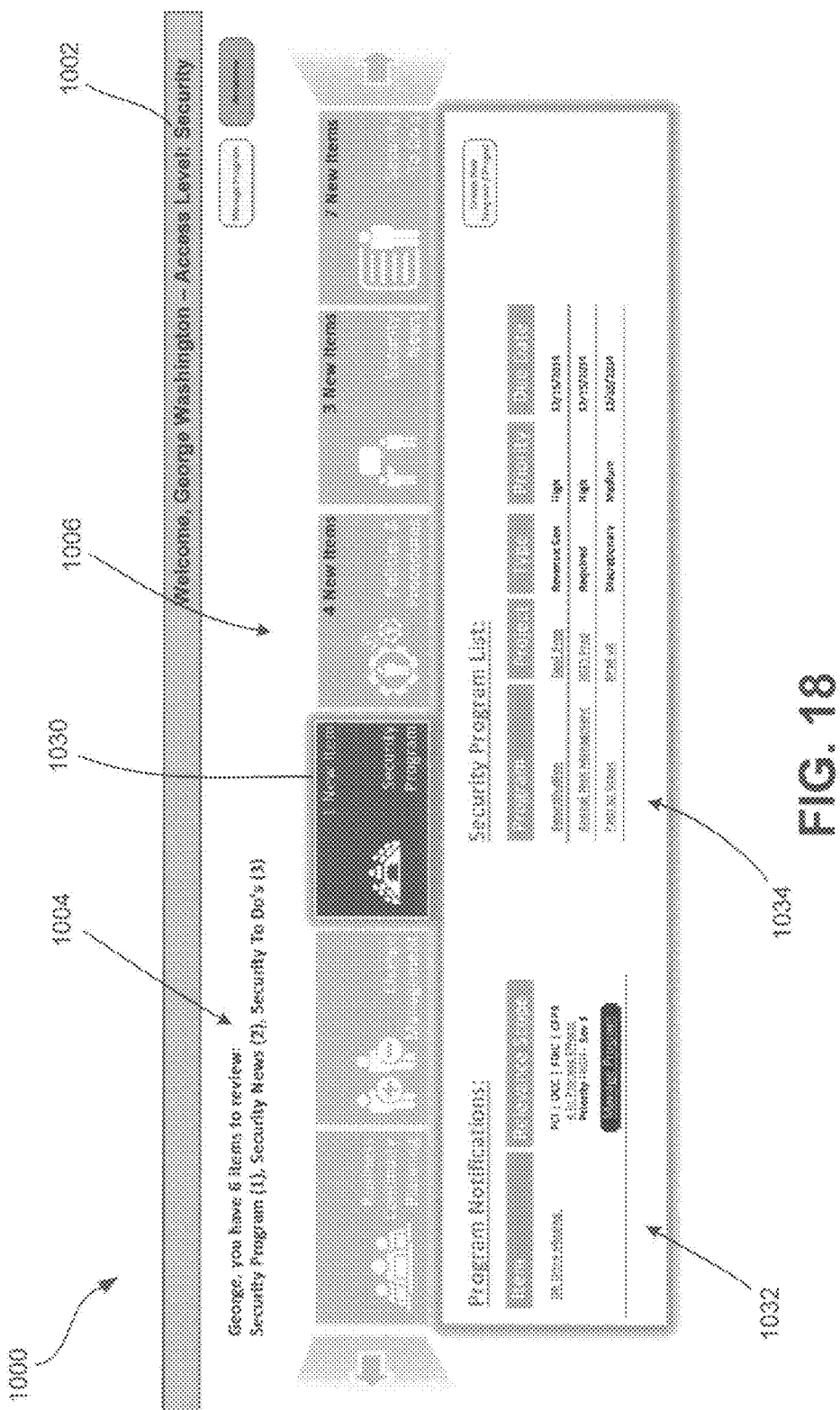
FIGS. 18-22 are screenshots of the interface provided by the system illustrating additional steps in the exemplary incident response scenario, including supporting tasks such as administration and organization of workflow assignments.
Figure 19:
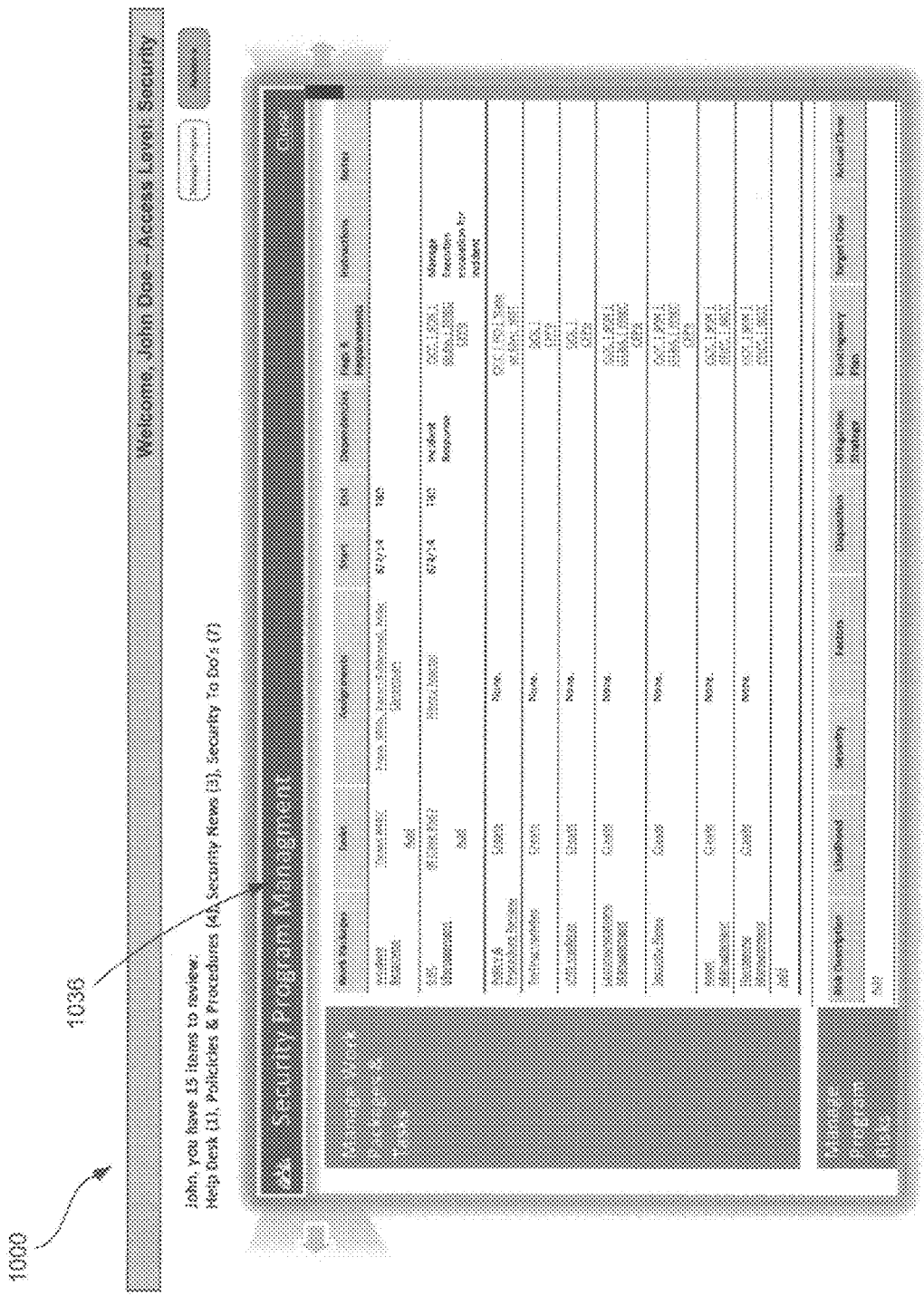
Figure 20:
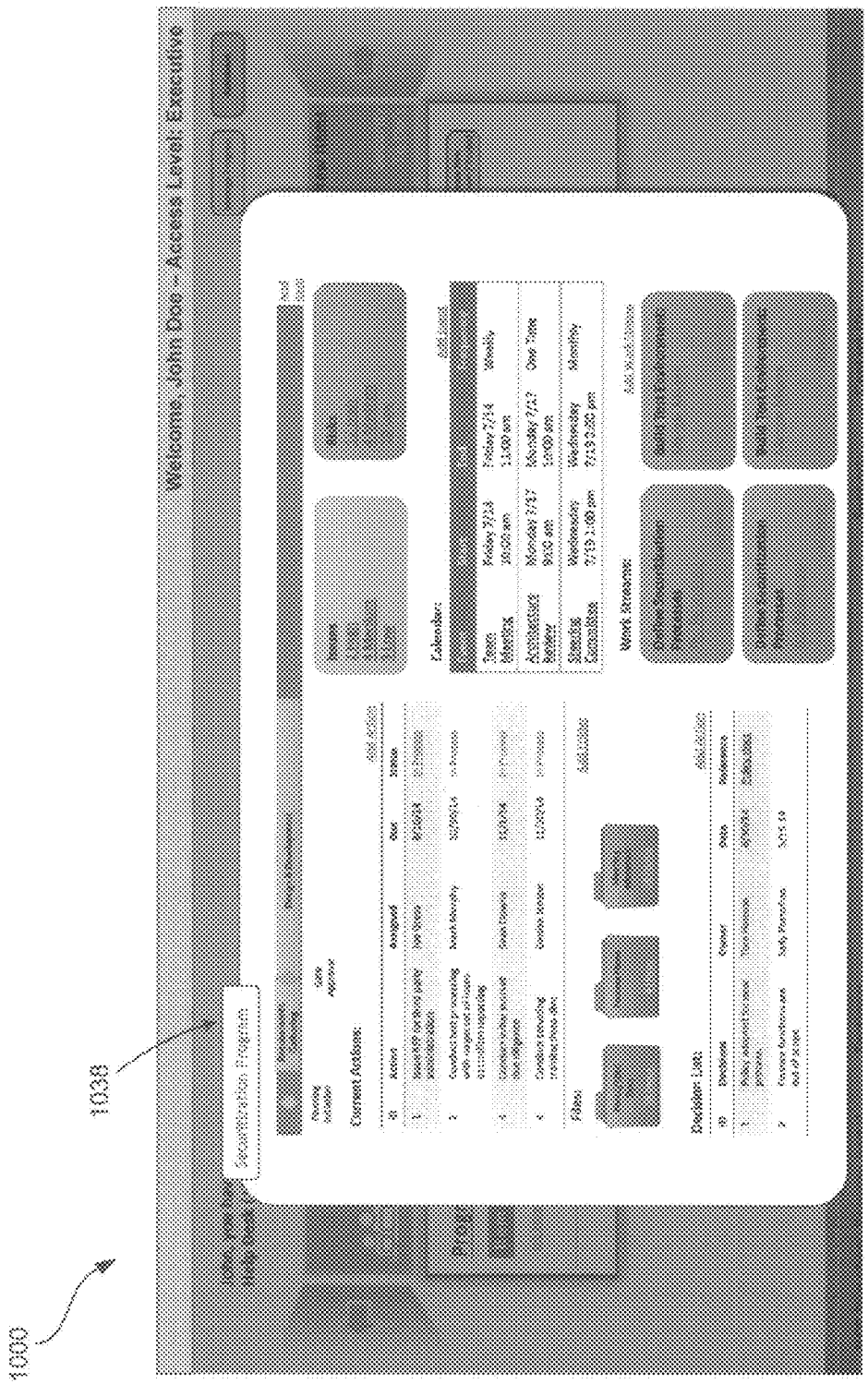

FIGS. 18-22 are screenshots of the portal 1000 provided by the system illustrating additional steps in the exemplary incident response scenario, including supporting tasks such as administration and business entity of workflow assignments. As shown in FIG. 18, the user is a security user (see 1002 banner), thus the notifications 1004 and tools 1006 provided on the portal 1000 are specific to a security user. The security user may utilize a security program tool 1030 to provide supporting tasks, such as administration and organization, organize work efforts. The security user may further view program notifications 1032 and a current security program list 1034. As shown in FIG. 19, upon selecting a security program tool, the portal 1000 provides a user with the ability to manage security programs 1036. More specifically, the system 12 is configured to build the work packages based on the security program relations and matrix for the organization and highlights regulatory and industry requirements. FIG. 20 illustrates a program dashboard 1038 provided to an executive user, for example. The program dashboard 1038 provides an executive user with oversight and tracking of securitization programs.

Figure 21:
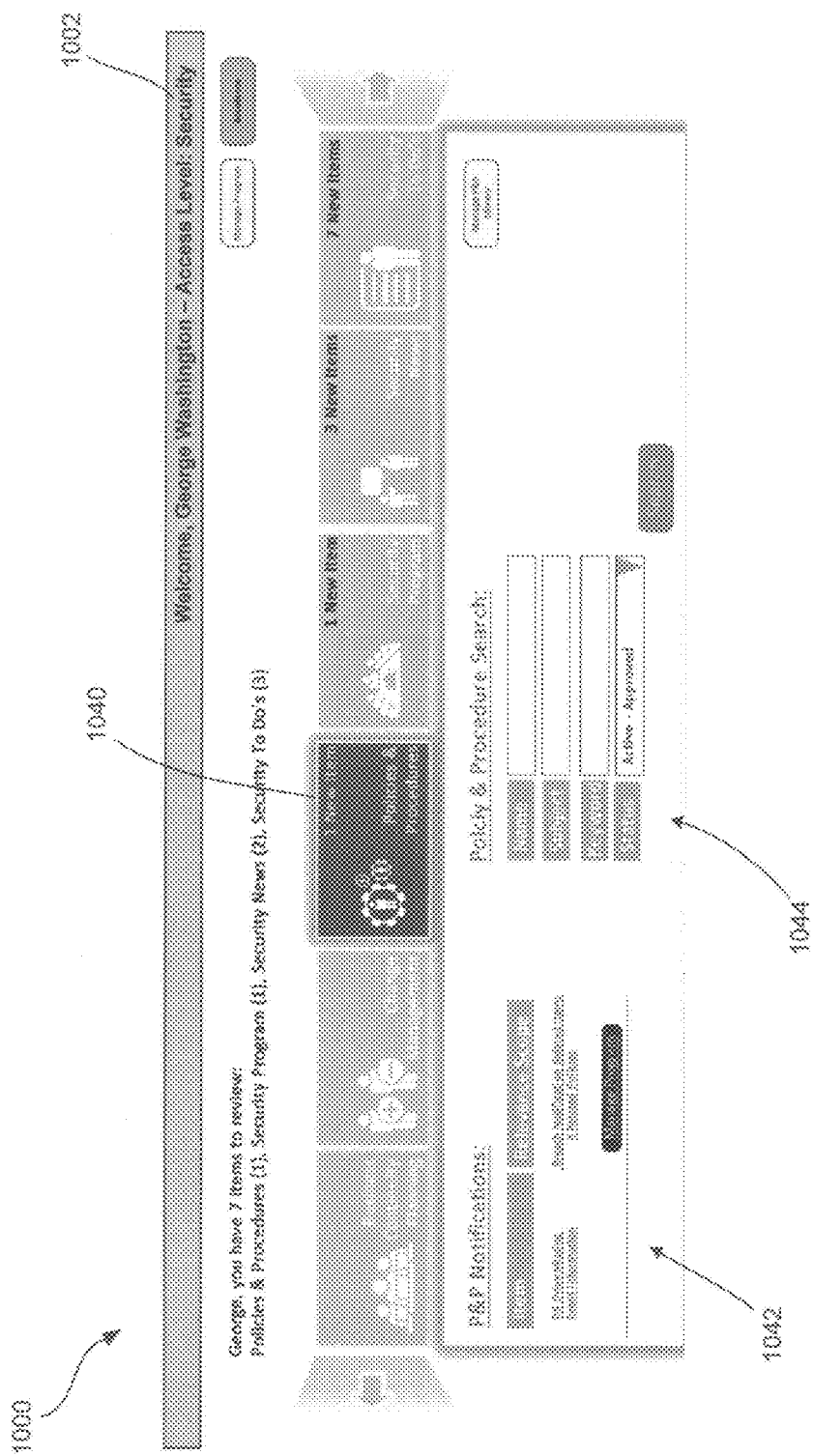
Figure 22:
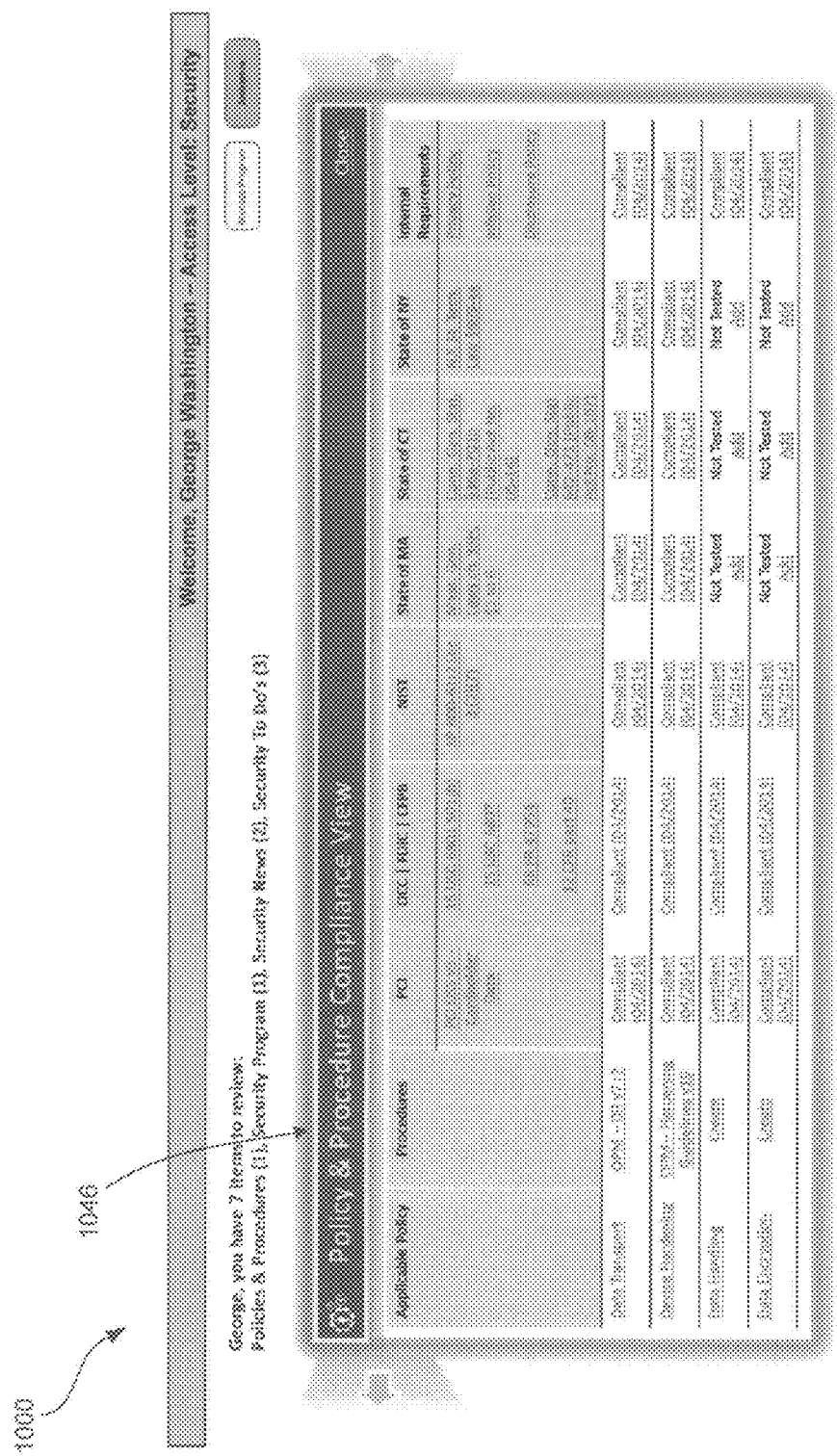

FIGS. 21 and 22 generally provide exemplary views of the portal 1000 providing policy and procedure tools and functions. When an event occurs that has compliance impacts, validation of key areas is initiated—such a having, or being able to demonstrate, the organization has the right policies in place. As shown in FIG. 21, a security user may have access to the policy and procedure tool 1040, which provides notifications 1042, as well as search functionality 1044 for obtaining a particular policy or procedure. FIG. 22 illustrates a policy and procedure compliance view 1046 as provided by the policy and procedure tool. Assessment and compliance statements are readily available for review, correlating information to specific industry and regulatory requirements.

Accordingly, the portal 1000 of the management system 12 of the present disclosure provides key tools and the ability to connect to a business entity's existing systems and infrastructure to help the business entity stay on top of its security needs. The system 12 provides real-time tracking of security elements across networks, data, process, and procedures. The portal 1000 provides tools to meet compliance requirements, address threats, and provide efficiencies and scalability for security across the enterprise. The portal 1000 further provides users the ability to manage and oversee workflows and efforts to make sure the business entity is getting the most out of security investments.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A system for providing a tailored security management framework for a business entity based on the business entity's operations, infrastructure, and user-based processes, as well as industry-specific rules and regulations associated with the business entity, the system comprising:

a network-based computing system configured to communicate and exchange data with one or more network access computing devices via a communications network, the network-based computing system comprises:
a first memory for receiving and storing a first set of data associated with the business entity, the first set of data comprises information related to at least one of the business entity's operations, the business entity's infrastructure, the business entity's procedures and policies, and one or more users authorized to have access to the system and exchange data associated with the business entity;

a second memory for receiving and storing a second set of data associated with an industry to which the business entity is related, the second set of data comprises industry-specific rules, regulations, and known security threats;

a processor that correlates the first and second sets of data with one another and generates a plurality of security schemes for use in the security management framework to assess and address potential security threats, wherein the correlation of the first and second sets of data comprises factoring the first and second sets of data in accordance with at least the formula:

$$\int_b^i prog = (prog_{comp}) \times RG_{ap} \times RA$$

wherein a domain of a security program (prog) is defined on an interval of the industry (i), the business entity (b) belonging to the specific business entity composition (comp), including a program components relationship group (RG) driven by applicability (a), priority (p), and risk assessment (RA); and an interface for receiving a request for access to data associated with the business entity;

wherein the processor compares request data with the plurality of security schemes and identifies a corresponding security scheme based on the comparison, the processor outputs informational data associated with the identified security scheme to a user associated with the one or more network access computing devices, the informational data comprises protocols or recommendations to facilitate actions to be taken by the user to address the received request for access to the business entity data, wherein the actions to be taken by the user, as facilitated by the protocols or recommendations, are in accordance with the business entity's security procedures and policies and industry-specific rules and regulations associated with the business entity.

2. The system of claim 1, wherein the first set of data is selected from the group consisting of: human resources, policies and procedures, physical infrastructure, virtual infrastructure, operating agreements, operational logs, risk factors, risk indicators, one or more users or parties associated with the business entity and corresponding level of security clearance with respect to business entity data, and a combination thereof.

3. The system of claim 1, wherein the second set of data is selected from the group consisting of: regulatory requirements, industry rules, industry threats, and a combination thereof.

4. The system of claim 1, wherein the request data is selected from the group consisting of: identity of a user or party requesting access, characteristics of a user or party requesting access, type of access requested, identity and characteristics of business entity data requested to be accessed, and a combination thereof.

5. The system of claim 4, wherein the characteristics of the user or party requesting access is selected from the group consisting of: user or party credentials, user or party role with respect to the business entity, user or party assignment to one of an internal trusted group and an external trusted group, and a combination thereof.

6. The system of claim 1, wherein the informational data associated with the identified security scheme is selected from the group consisting of: level of threat associated with the request, identity of a user or party requesting access, assigned role and level of clearance of a user or party requesting access with respect to the business entity, sensitivity of business entity data requested to be accessed, protocol for addressing the requested access, actions required in order to fulfill request, and a combination thereof.

7. The system of claim 1, wherein the processor is further configured to set priority and baseline values for each of the plurality of security schemes based on the factoring step.

8. The system of claim 1, wherein the processor is configured to continually monitor for input data from one or more users via the interface and update generated security schemes by correlating the input data with the first and second sets of data.

9. The system of claim 1, wherein the network-based computing system comprises a server configured to manage business entity data and provide access to the business entity data to a user associated with the one or more devices over the network via a wired transmission or a wireless transmission protocol selected from the group consisting of: Bluetooth communication, infrared communication, near field communication (NFC), radio-frequency identification (RFID) communication, cellular network communication, and a combination thereof.

10. The system of claim 1, wherein the one or more network access computing devices are selected from the group consisting of: a personal computer (PC), a desktop computer, a notebook computer, a tablet computer, a mobile computing device, a smartphone, a cellular telephone, a messaging device, a work station, a network appliance, a web appliance, a distributed computing system, a multiprocessor system, a processor-based system, a consumer electronic device, and a combination thereof.

11. A computer-implemented method for providing a tailored security management framework for a business entity based on the business entity's operations, infrastructure, and user-based processes, as well as industry-specific rules and regulations associated with the business entity, comprising executing on a processor the steps of:

storing a first set of data associated with the business entity in a first memory location, the first set of data comprises information related to at least one of the business entity's operations, the business entity's infrastructure, the business entity's procedures and policies, and one or more users authorized to have access to data associated with the business entity;

storing a second set of data associated with an industry to which the business entity is related, the second set of data comprises industry-specific rules, regulations, and known security threats;

correlating, with a processor, the first and second sets of data with one another and generating, with the processor, a plurality of security schemes based on the correlation, the plurality of security schemes for use in the security management framework to assess and address potential security threats, wherein the correlation of the first and second sets of data comprises factoring the first and second sets of data in accordance with at least the formula:

$$\int_b^i prog = (prog_{comp}) \times RG_{ap} \times RA$$

wherein a domain of a security program (prog) is defined on an interval of the industry (i), the business entity (b) belonging to the specific business entity composition (comp), including a program components relationship group (RG) driven by applicability (a), priority (p), and risk assessment (RA);

receiving, via an interface, a request for access to data associated with the business entity;

comparing, with the processor, request data with the plurality of security schemes to identify a corresponding security scheme; and outputting, via a communications network, informational data associated with the identified security scheme to a user associated with one or more network access computing devices, the informational data comprises protocols or recommendations to facilitate actions to be taken by the user to address the received request for access to the business entity data, wherein the actions to be taken by the user, as facilitated by the protocols or recommendations, are in accordance with the business entity's security procedures and policies and industry-specific rules and regulations associated with the business entity.

12. The method of claim 11, wherein the first set of data is selected from the group consisting of: human resources, policies and procedures, physical infrastructure, virtual infrastructure, operating agreements, operational logs, risk factors, risk indicators, one or more users or parties associated with the business entity and corresponding level of security clearance with respect to business entity data, and a combination thereof.

13. The method of claim 11, wherein the second set of data is selected from the group consisting of: regulatory requirements, industry rules, industry threats, and a combination thereof.

14. The method of claim 11, wherein the request data is selected from the group consisting of: identity of a user or party requesting access, characteristics of a user or party requesting access, type of access requested, identity and characteristics of business entity data requested to be accessed, and a combination thereof.

15. The method of claim 14, wherein the characteristics of the user or party requesting access is selected from the group consisting of: user or party credentials, user or party role with respect to the business entity, user or party assignment to one of an internal trusted group and an external trusted group, and a combination thereof.

16. The method of claim 11, wherein the informational data associated with the identified security scheme is selected from the group consisting of: level of threat associated with the request, identity of a user or party requesting access, assigned role and level of clearance of a user or party requesting access with respect to the business entity, sensitivity of business entity data requested to be accessed, protocol for addressing the requested access, actions required in order to fulfill request, and a combination thereof.

17. The method of claim 11, wherein correlating the first and second sets of data with one another to generate a plurality of security schemes further comprises setting, with the processor, priority and baseline values for each of the plurality of security schemes based on the factoring step.

18. The method of claim 11, further comprising monitoring, with the processor, communications via the interface and detecting input data from one or more users and automatically updating, with the processor, security schemes based on correlation of the input data with the first and second sets of data.

19. A non-transitory computer-readable medium for providing a tailored security management framework for a business entity, comprising instructions stored thereon, that when executed on a processor, perform the steps of:

storing a first set of data associated with the business entity in a first memory location, the first set of data comprises information related to at least one of the business entity's operations, the business entity's infrastructure, the business entity's procedures and policies, and one or more users authorized to have access to data associated with the business entity;

storing a second set of data associated with an industry to which the business entity is related, the second set of data comprises industry-specific rules, regulations, and known security threats;

correlating the first and second sets of data with one another and generating, with the processor, a plurality of security schemes based on the correlation, the plurality of security schemes for use in the security management framework to assess and address potential security threats, wherein the correlation of the first and second sets of data comprises factoring the first and second sets of data in accordance with at least the formula:

$$\int_b^i \text{prog} = (\text{prog}_{comp}) \times RG_{ap} \times RA$$

wherein a domain of a security program (prog) is defined on an interval of the industry (i), the business entity (b) to the specific business entity composition (comp), including a program components relationship group (RG) driven by applicability (a), priority (p), and risk assessment (RA);

receiving a request for access to data associated with the business entity;

comparing request data with the plurality of security schemes to identify a corresponding security scheme; and outputting informational data associated with the identified security scheme to a user associated with one or more network access computing devices, the informational data comprises protocols or recommendations to facilitate actions to be taken by the user to address the received request for access to the business entity data, wherein the actions to be taken by the user, as facilitated by the protocols or recommendations, are in accordance with the business entity's security procedures and policies and industry-specific rules and regulations associated with the business entity.

20. The non-transitory computer-readable medium of claim 19, wherein the first set of data is selected from the group consisting of: human resources, policies and procedures, physical infrastructure, virtual infrastructure, operating agreements, operational logs, risk factors, risk indicators, one or more users or parties associated with the business entity and corresponding level of security clearance with respect to business entity data, and a combination thereof.

21. The non-transitory computer-readable medium of claim 19, wherein the second set of data is selected from the group consisting of: regulatory requirements, industry rules, industry threats, and a combination thereof.

22. The non-transitory computer-readable medium of claim 19, wherein the request data is selected from the group consisting of: identity of a user or party requesting access, characteristics of a user or party requesting access, type of access requested, identity and characteristics of business entity data requested to be accessed, and a combination thereof.

23. The non-transitory computer-readable medium of claim 22, wherein the characteristics of the user or party requesting access is selected from the group consisting of: user or party credentials, user or party role with respect to the business entity, user or party assignment to one of an internal trusted group and an external trusted group, and a combination thereof.

24. The non-transitory computer-readable medium of claim 19, wherein the informational data associated with the identified security scheme is selected from the group consisting of: level of threat associated with the request, identity of a user or party requesting access, assigned role and level of clearance of a user or party requesting access with respect to the business entity, sensitivity of business entity data requested to be accessed, protocol for addressing the requested access, actions required in order to fulfill request, and a combination thereof.

25. The non-transitory computer-readable medium of claim 19, wherein correlating the first and second sets of data with one another to generate a plurality of security schemes further comprises setting priority and baseline values for each of the plurality of security schemes based on the factoring step.

26. The non-transitory computer-readable medium of claim 19, further comprising monitoring communications and detecting input data from one or more users and automatically updating security schemes based on correlation of the input data with the first and second sets of data.

\* \* \* \* \*